United States Patent
Olmstead

(10) Patent No.: US 9,712,806 B2
(45) Date of Patent: Jul. 18, 2017

(54) DEPTH CAMERA SYSTEM USING CODED STRUCTURED LIGHT

(71) Applicant: Datalogic ADC, Inc., Eugene, OR (US)

(72) Inventor: Bryan Olmstead, Eugene, OR (US)

(73) Assignee: DATALOGIC ADC, INC., Eugene, OR (US)

(*) Notice: Subject to any disclaimer, the term of this patent is extended or adjusted under 35 U.S.C. 154(b) by 259 days.

(21) Appl. No.: 14/577,791

(22) Filed: Dec. 19, 2014

(65) Prior Publication Data

US 2016/0182889 A1    Jun. 23, 2016

(51) Int. Cl.

| | |
|---|---|
| *G06T 7/00* | (2017.01) |
| *H04N 13/02* | (2006.01) |
| *H04N 19/17* | (2014.01) |
| *H04N 19/44* | (2014.01) |
| *H04N 13/00* | (2006.01) |
| *G01B 11/25* | (2006.01) |
| *G06K 9/20* | (2006.01) |
| *G06T 7/521* | (2017.01) |

(52) U.S. Cl.
CPC ..... *H04N 13/0239* (2013.01); *G01B 11/2513* (2013.01); *G06K 9/2036* (2013.01); *G06T 7/521* (2017.01); *H04N 13/0048* (2013.01); *H04N 19/17* (2014.11); *H04N 19/44* (2014.11)

(58) Field of Classification Search
None
See application file for complete search history.

(56) References Cited

U.S. PATENT DOCUMENTS

| | | | |
|---|---|---|---|
| 6,754,370 B1 * | 6/2004 | Hall-Holt | G01B 11/25 356/3 |
| 7,506,816 B2 | 3/2009 | Olmstead | |
| 8,360,318 B2 | 1/2013 | Reynolds et al. | |
| 2004/0246473 A1 * | 12/2004 | Hermary | G01B 11/245 356/237.1 |
| 2006/0210146 A1 * | 9/2006 | Gu | G01B 11/25 382/154 |

(Continued)

OTHER PUBLICATIONS

Geng, Jason. "Structured-light 3D surface imaging: a tutorial." Advances in Optics and Photonics 3.2 (2011): 128-160.*

(Continued)

*Primary Examiner* — Chan Park
*Assistant Examiner* — Geoffrey E Summers
(74) *Attorney, Agent, or Firm* — Seed IP Law Group LLP

(57) ABSTRACT

Depth camera systems and methods of operation use coded structured light to determine depth values. One example method includes projecting a structured light pattern towards a target region. The structured light pattern includes a plurality of parallel bars that encode a plurality of codes. The method includes, for each of a plurality of rows of pixels that are transverse to the plurality of parallel bars: decoding the plurality of parallel bars represented in the row of pixels to identify a location of each of the plurality of codes in the row of pixels; determining a plurality of disparities respectively between the identified locations of the plurality of codes and a plurality of reference locations respectively associated with the plurality of codes; and determining a depth value for each identified location based at least in part on the determined disparity for such location.

21 Claims, 16 Drawing Sheets

(56) References Cited

U.S. PATENT DOCUMENTS

| | | | |
|---|---|---|---|
| 2010/0079581 A1* | 4/2010 | Russell | H04N 13/0253 |
| | | | 348/46 |
| 2011/0075156 A1 | 3/2011 | Patel et al. | |
| 2012/0237112 A1 | 9/2012 | Veeraraghavan et al. | |
| 2013/0314696 A1 | 11/2013 | Atanassov et al. | |

OTHER PUBLICATIONS

Salvi, Joaquim, Jordi Pages, and Joan Batlle. "Pattern codification strategies in structured light systems." Pattern recognition 37.4 (2004): 827-849.*

Salvi, Joaquim, et al. "A state of the art in structured light patterns for surface profilometry." Pattern recognition 43.8 (2010): 2666-2680.*

Rodrigues, Marcos (2011). Fast 3D Reconstruction using Structured Light Methods. In: International Conference on Medical Image Computing and Computer Assisted Intervention, Toronto, Canada, Sep. 18-22.*

"PrimeSense," Wikipedia, retrieved on Dec. 17, 2014, from http://en.wikipedia.org/wiki/PrimeSense, 7 pages.

Albitar et al., "Robust Structured Light Coding for 3D Reconstruction," IEEE 11$^{th}$ International Conference on Computer Vision, Rio de Janeiro, Brazil, Oct. 14-21, 2007, 6 pages.

Batlle et al., "Recent Progress in Coded Structured Light as a Technique to Solve the Correspondence Problem: A Survey," *Pattern Recognition* 31(7):963-982, 1998.

Brading et al., "Using 3D sensors to bring depth discernment to embedded vision apps," Embedded, Apr. 13, 2013, retrieved on Dec. 18, 2014, from http://www.embedded.com/print/4411991, 8 pages.

Fernandez, "One-shot pattern projection for dense and accurate 3D acquisition in structured light," Computer Vision and Robotics group (VICOROB), University of Girona, 2012, 39 pages.

Geng, "Structured-light 3D surface imaging: a tutorial," *Advances in Optics and Phototonics* 3:128-160, 2011.

Pagés et al., "Coded light projection techniques for 3D reconstruction," J3eA, Journal sur l'enseignement des sciences et technologies de l'information et des systémes, vol. 4, Hors-Série 3, 1, 2005, 8 pages.

Petriu et al., "Visual Object Recognition Using Pseudo-Random Grid Encoding," Proceedings of the 1992 IEEE/RSJ International Conference on Intelligent Robots and Systems, Raleigh, NC, Jul. 7-10, 1992, pp. 1617-1624.

Salvi et al., "Pattern codification strategies in structured light systems," *Pattern Recognition* 37:827-849, 2004.

Vuylsteke et al., "Range Image Acquisition with a Single Binary-Encoded Light Pattern," *IEEE Transactions on Pattern Analysis and Machine Intelligence* 12(2):148-164, Feb. 1990.

Xu et al., "Robust Dense Depth Acquisition Using 2-D De Bruijn Structured Light," *ICEC* 2007, *LNCS* 4740, pp. 304-314, 2007.

Young et al., "Viewpoint-Coded Structured Light," IEEE Computer Society Conference on Computer Vision and Pattern Recognition (CVPR), Jun. 2007, 8 pages.

Zhang et al., "Rapid Shape Acquisition Using Color Structured Light and Multi-pass Dynamic Programming," Proceedings of the 1$^{st}$ International Symposium on 3D Data Processing, Visualization, and Transmission (3DPVT), Padova, Italy, Jun. 19-21, 13 pages.

Forest et al., "Laser stripe peak detector for 3D scanners. A FIR filter approach," *Proceedings of the 17$^{th}$ International Conference on Pattern Recognition*, IEEE, Aug. 26, 2004, pp. 646-649. (4 pages).

International Search Report, mailed Mar. 17, 2016, for corresponding International Application No. PCT/US2015/066799, 7 pages.

Pagès et al., "A new optimised De Bruijn coding strategy for structured light patterns," *Proceedings of the 17$^{th}$ International Conference on Pattern Recognition*, IEEE, Aug. 26, 2004, pp. 284-287. (4 pages).

* cited by examiner

DEPTH CAMERA SYSTEM USING CODED STRUCTURED LIGHT

BACKGROUND

Technical Field

The present disclosure generally relates to depth camera systems and, more particularly, depth camera systems that employ coded structured light.

Description of the Related Art

There are many types of depth camera technologies, including, for example, time of flight, passive and active stereo, and structured light. Such technologies enable a depth camera system to determine depth values for a scene observed by the system. For example, each depth value may be representative of a distance from the depth camera system to a particular object contained within the scene.

Systems that perform time of flight techniques rapidly pulse a light source and determine a delay between emission of the light and reception of light reflected from various locations in the scene. A system that performs time of flight techniques typically requires a complex, custom imaging sensor.

Systems that perform stereo techniques match corresponding image points respectively seen by plural cameras. Such correspondence detection requires significant processing, particularly when applied to image regions that are homogenous in color or intensity. Thus, in order to perform well with respect to untextured scenes, depth camera systems often augment stereo techniques by using a projected light pattern, also known as active stereo. Rectifying the images can simplify processing by allowing the correlation to occur along a linear shift called the epipolar line. However, stereo techniques still include a significant processing time and cost.

Structured light systems typically include a camera and a projector. The projector projects a pattern of light (i.e., structured light) towards the scene. The system compares the locations of certain features of the pattern in a captured image of the illuminated scene with locations of the features in a reference image to determine disparities. Such disparities can be used to determine depth at each location. However, for complex patterns, detection of pattern features and/or matching of detected features with reference features can be computationally expensive, similar to stereo techniques.

Other structured light techniques exist, as well. For example, temporal structured light methods use a sequence of light patterns emitted by a programmable projector to provide accurate range maps. However, temporal techniques typically require the scene to be remain stationary.

BRIEF SUMMARY

The above noted techniques generally require a trade-off between lateral resolution, range resolution, motion tolerance, processing cost, and/or hardware complexity to achieve their respective results.

Therefore, improved depth camera systems that maintain or improve temporal and/or lateral resolution while reducing hardware and/or processing cost are desired. In particular, depth camera systems that provide the temporal and lateral resolution benefits of single-shot structured light systems while significantly reducing computational complexity are desired. Furthermore, systems that provide true three-dimensional information without requiring object motion are desired.

A method to determine depth values may be summarized as including: projecting a structured light pattern towards a target region, the structured light pattern comprising a plurality of parallel bars that encode a plurality of codes; receiving an image of at least a portion of the target region, the image comprising a plurality of pixels representative of at least a portion of the structured light pattern; and for each of a plurality of rows of pixels that are transverse to the plurality of parallel bars: decoding the plurality of parallel bars represented in the row of pixels to identify a location of each of the plurality of codes in the row of pixels; determining a plurality of disparities respectively between the identified locations of the plurality of codes and a plurality of reference locations respectively associated with the plurality of codes; and determining a depth value for each identified location based at least in part on the determined disparity for such location.

The method may further include: performing a spatial frequency modulation encoding with respect to a binary de Bruijn sequence of order n to obtain the structured light pattern, wherein n comprises a positive integer. Performing a spatial frequency modulation coding technique may include transforming each bit of value 1 in the binary de Bruijn sequence into a lit element of a width E and a first dark element of the width E and transforming each bit of value 0 in the binary de Bruijn sequence into the lit element of the width E and a second dark element of width 3E. Performing a spatial frequency modulation coding technique may include performing the spatial frequency modulation coding technique with respect to the binary de Bruijn sequence of order 7 and comprising 128 unique, overlapping codes. Decoding the plurality of parallel bars to identify a location of each of the plurality of codes may include determining a plurality of width values respectively between the plurality of parallel bars represented in the row of pixels and identifying the location of each of the plurality of codes in the row of pixels based at least in part on the plurality of width values. Determining a plurality of width values may include identifying a plurality of pixel intensity value peaks that respectively correspond to centers of the plurality of parallel bars represented in the row of pixels and determining the plurality of width values respectively between the plurality of pixel intensity value peaks. Determining a plurality of pixel intensity value peaks may include deblurring the image with a linear finite impulse response (FIR) deblurring equalizer and performing a peak finding scheme with respect to a plurality of pixel intensity values of the row of pixels. Identifying the location of each of the plurality of codes based at least in part on the plurality of width values may include transforming the plurality of width values into a decoded binary sequence and identifying the location of each of the plurality of codes within the decoded binary sequence. Transforming the plurality of width values into a decoded binary sequence may include generating a histogram based at least in part on the plurality of width values, determining a threshold width value based at least in part on the histogram, and classifying each of the plurality of width values as a 1 value, a 0 value, or an error based at least in part on the threshold width value. Generating a histogram based at least in part on the plurality of width values may include generating the histogram based at least in part on the plurality of width values and the plurality of width values divided by 2. Determining a threshold width value may include identifying a median value of the histogram and multiplying the median value times 1.5. Determining a threshold width value based at least in part on the histogram may include generating a rolling threshold width value for each of the plurality of width values based on a moving window that spans two times a code length associated with the plurality of codes and wherein classifying each of the plurality of width values may include classifying each of the plurality of width values as a 1 value, a 0 value, or an error based at least in part on the rolling threshold width value generated for such width value. Projecting a structured light pattern may include projecting the structured light pattern comprising the plurality of parallel bars that encode a plurality of binary codes of bit length n and wherein identifying the location of each of the plurality of binary codes within the decoded binary sequence may include identifying the location of a first bit of each of the plurality of codes in the decoded binary sequence. The method may further include, for each of the plurality of rows of pixels: determining that one or more of the identified locations of the plurality of codes are erroneous by comparing an observed sequential characteristic for each code to an expected sequential characteristic for each code. The method may further include: projecting the structured light pattern comprising the plurality of parallel bars toward a planar surface displaced at a known distance; receiving a reference image of the planar surface, the reference image comprising a second plurality of pixels; and storing, for at least one row of the second plurality of pixels of the reference image that is transverse to the plurality of parallel bars, a position of each of the plurality of codes within such row as the reference location of such code.

A system may be summarized as including: at least one processor; and at least one non-transitory processor-readable medium that is communicatively coupled to the at least one processor and that stores at least one of processor-executable instructions and data that, when executed by the at least one processor, cause the system to: receive an image that depicts at least a portion of a target region illuminated with a coded structured light pattern, the coded structured light pattern comprising a plurality of parallel bars that encode a plurality of codes, the image comprising a plurality of pixels representative of at least a portion of the coded structured light pattern; and for each of a plurality of rows of pixels of the image that are transverse to the plurality of parallel bars: decode the plurality of parallel bars represented in the row of pixels to identify a location of each of the plurality of codes; determine a plurality of disparities respectively between the identified locations of the plurality of codes and a plurality of reference locations respectively associated with the plurality of codes; and determine a depth value for each identified location based at least in part on the determined disparity for such location.

The plurality of codes may include a binary de Bruijn sequence of order n, wherein n includes a positive integer. The instructions that cause the system to decode the plurality of parallel bars represented in the row of pixels may cause the system to determine a plurality of width values respectively between the plurality of parallel bars represented in the row of pixels and identify the location of each of the plurality of codes based at least in part on the plurality of width values. The instructions that cause the system to determine a plurality of width values respectively between the plurality of parallel bars may cause the system to identify a plurality of pixel intensity value peaks that respectively correspond to centers of the plurality of parallel bars represented in the row of pixels and determine the plurality of width values respectively between the plurality of pixel intensity value peaks. The instructions that cause the system to identify the location of each of the plurality of codes based at least in part on the plurality of width values may cause the system to transform the plurality of width values into a decoded binary sequence and identify the location of each of the plurality of codes within the decoded binary sequence. The instructions that cause the system to transform the plurality of width values into a decoded binary sequence may cause the system to generate a histogram based at least in part on the plurality of width values, determine a threshold width value based at least in part on the histogram, and classify each of the plurality of width values as a 1 value, a 0 value, or an error based at least in part on the threshold width value. The instructions that cause the system to generate a histogram based at least in part on the plurality of width values may cause the system to generate the histogram based at least in part on the plurality of width values and the plurality of width values divided by 2 and wherein the instructions that cause the system to determine a threshold width value based at least in part on the histogram may cause the system to identify a median value of the histogram and multiply the median value times 1.5. The instructions may further cause the system to, for each of the plurality of rows of pixels: compare an observed sequential characteristic of each code to an expected sequential characteristic of such code to determine whether the identified location of such code is erroneous. The instructions may further cause the system to: obtain a reference image that depicts a planar surface displaced at a known distance and illuminated with the plurality of parallel bars that encode the plurality of codes, the reference image including a second plurality of pixels; and for at least one row of the second plurality of pixels that is transverse to the plurality of parallel bars, decode the plurality of parallel bars represented in the row of pixels to identify a reference location of each of the plurality of codes. The system may further include: a projector selectively operable to project the coded structured light pattern towards the target region, the projector separate from but attachable to a two-dimensional image capture device.

A method to determine depth values may be summarized as including: for a set of image data that represents an image of at least a portion of a target region illuminated with a two-dimensional coded structured light pattern that comprises a plurality of parallel bars and that encodes a sequence of unique binary codes, the image comprising a plurality of pixels representative of at least a portion of the two-dimensional coded structured light pattern, for each of a plurality of rows of the plurality of pixels that are transverse to the plurality of parallel bars: determining a plurality of locations in the row of pixels respectively associated with a plurality of pixel intensity value peaks; determining a plurality of width values by subtracting from each of the plurality of locations a respective previous sequential location; binarizing the plurality of width values to form a decoded binary sequence; identifying one or more of the unique binary codes within the decoded binary sequence; assigning a respective one of the plurality of locations in the row of pixels to each of the one or more unique binary codes identified within the decoded binary sequence; determining, for each assigned location, a disparity between such location and a reference location associated with the unique binary code to which such location is assigned; and determining, for each assigned location, a depth value based at least in part on the disparity determined for such location.

The sequence of unique binary codes may include a binary de Bruijn sequence of order n, wherein n includes a positive integer. Binarizing the plurality of width values to form a decoded binary sequence may include generating for each of the plurality of width values a rolling binarization threshold that spans a number of width values greater than or equal to two times a code length and classifying each of the plurality of width values based at least in part on the rolling binarization threshold generated for such width value. Identifying one or more of the unique binary codes within the decoded binary sequence may include performing error detection by comparing, for each of the one or more of the unique binary codes identified within the decoded binary sequence, an observed sequence characteristic with an expected sequence characteristic.

A projector to project structured light may be summarized as including: at least one light source selectively operable to emit light; wherein, when the at least one light source is operated to emit light, the projector projects a two-dimensional coded structured light pattern comprising a plurality of parallel bars that encode a binary de Bruijn sequence of order n, wherein n comprises a positive integer.

The projector may be separate from but attachable to a two-dimensional image capture device. The projector may further include: control circuitry that controls the at least one light source; a housing that encloses the control circuitry; and an arm that extends from the housing, wherein a first end of the arm that is distal from the housing is attachable to the two-dimensional image capture device. The control circuitry may control the at least one light source to pulse light synchronously with an image capture interval associated with the two-dimensional image capture device. The control circuitry may include a Genlock hardware trigger that causes the at least one light source to pulse light synchronously with an image capture interval associated with the two-dimensional image capture device. A length of the arm may be adjustable to adjust a baseline distance between the projector and the two-dimensional image capture device. The two-dimensional image capture device may include a smartphone or a tablet computing device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures have not been shown or described in detail to avoid unnecessarily obscuring descriptions of the embodiments, including structures and methods of operation associated with computing devices, image capture devices (e.g., cameras), and other components of a depth camera system.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not interpret the scope or meaning of the embodiments.

Figure 1:
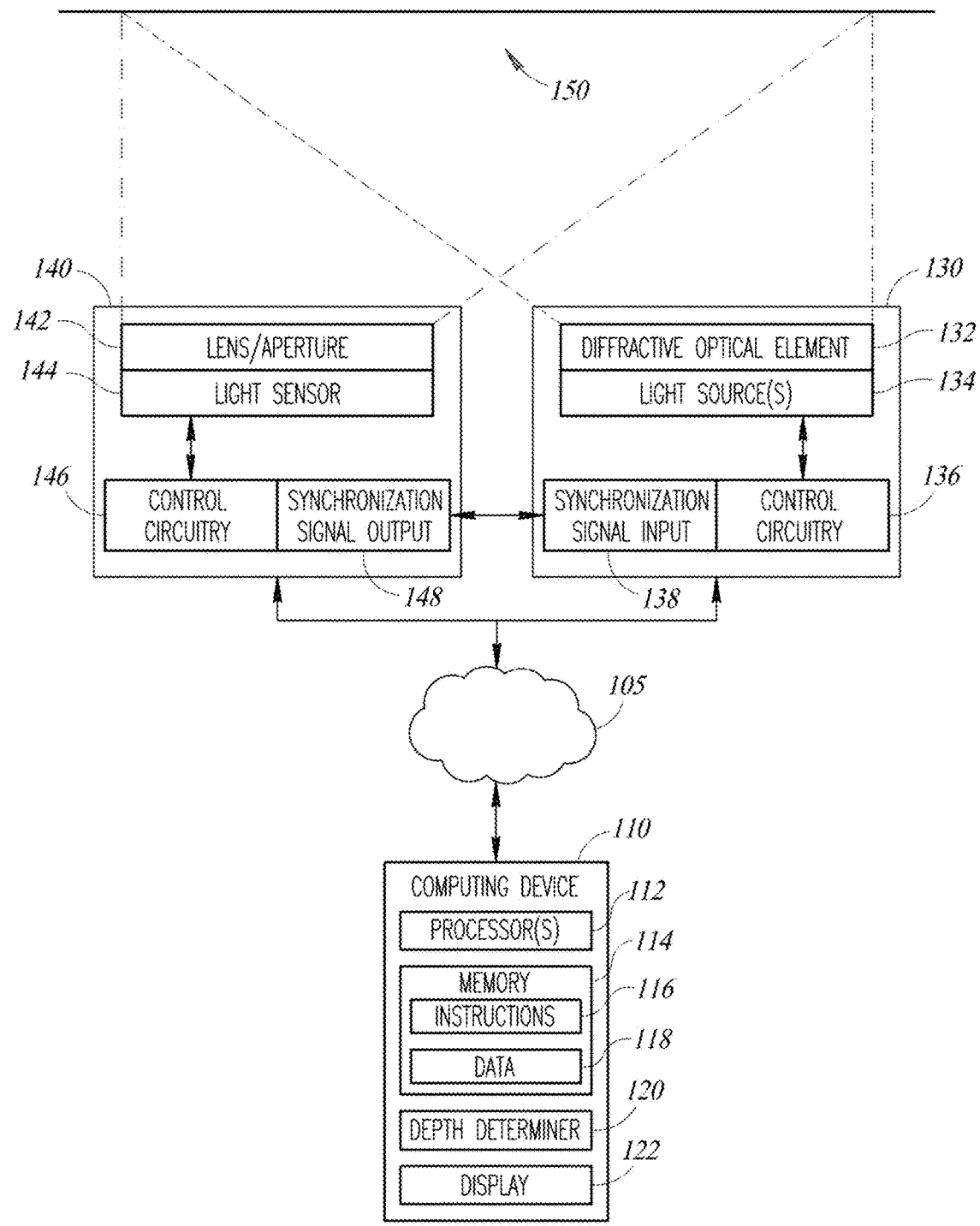
FIG. 1 is a block diagram of an example depth camera system, according to at least one illustrated embodiment.

FIG. 1 is a block diagram of an example depth camera system 100, according to at least one illustrated embodiment. System 100 includes a computing device 110, a projector 130, and an image capture device 140 communicatively coupled over a network 105. The depth camera system 100 employs a structured light pattern with a plurality of parallel bars that encode a plurality of codes to determine depth values for images of a target region 150. The target region 150 can be any number of different ranges of distances from the system 100, including, only as an example, ranges on the order of nanometers, millimeters, centimeters, or meters.

In some implementations, the computing device 110 is an embedded computing device. For example, the computing device 110, projector 130, and/or image capture device 140 can form all or a portion of a depth camera system embedded within a vehicle, a machine-readable symbol reading system, an artificial intelligence device, an inventory tracking system, an industrial automation system, or any other system or device for which determination of depth values is beneficial.

In other implementations, the computing device 110 is a desktop computer, laptop computer, tablet computer, smartphone, gaming console, one or more server computing devices, or some combination thereof. The computing device 110 can perform computing operations according to any computer architecture, including parallel, sequential, and/or distributed computing architectures.

In some implementations, a single housing or assembly encloses the computing device 110, the projector 130, and the image capture device 140.

Computing device 110 includes a processor 112 and a memory 114. The processor 112 can be one processor or a plurality of processors that are operatively coupled. The processor 112 can be any processing device, such as a microprocessor, microcontroller, integrated circuit, circuitry that implements computer logic, or some combination thereof. The memory 114 can include any non-transitory information storage device, including, but not limited to, RAM, ROM, hard drives, flash drives, optical media, other memory devices, or some combination thereof. The memory 114 can store information accessible by processor 112, including instructions 116 that can be executed by processor 112. The instructions 116 can be any set of instructions that when executed by the processor 112, cause the processor 112 to provide desired functionality. The memory 114 can also store data 118.

The computing device 110 includes a depth determiner 120. The computing device 110 implements the depth determiner 120 to determine a plurality of depth values for one or more images captured by the image capture device 140. For example, computing device 110 can implement depth determiner to perform aspects of methods 400 and 900 of FIGS. 4 and 9, respectively. In some implementations, the depth determiner 120 includes one or more subcomponents, such as, for example, a decoder.

In some implementations, the depth determiner 120 includes processor-executable instructions stored in or loaded into memory 114 and executed by processor 112. In other implementations, the depth determiner 120 includes one or more circuits (e.g., integrated circuits), logic components, or other items of computer hardware arranged to implement computer logic or perform other functionality. In other implementations, the depth determiner 120 can be implemented using some combination of processor-executable instructions or data and circuitry.

In some implementations, the computing device 110 further includes a display 122. For example, the computing device 110 can present or otherwise show a depth information on the display 122 (e.g., in the form of a rendering of a three-dimensional point cloud, a depth map, or other visualizations of depth information). The display 122 can be any display device including, for example, a monitor, a screen, a holographic display, a projection display, a three-dimensional display, etc.

The projector 130 is selectively operable to project a structured light pattern towards a target region 150. For example, the structured light pattern can include a plurality of bars that encode a plurality of codes, as will be discussed further below. In other implementations, however, the projector 130 projects structured light patterns other than those particularly provided by the present disclosure, including, for example, random dots, lines, grids, or other coded or non-coded patterns.

The projector 130 includes one or more light sources 134, a diffractive optical element 132, control circuitry 136, and a synchronization signal input 138. The one or more light sources can include one or more lasers, light emitting diodes (LEDs), lamps, other light sources, or some combination thereof. The control circuitry 136 of the projector 130 controls the light source(s) 134 to selectively emit light.

The diffractive optical element 130 transforms or otherwise alters light emitted by the light source(s) 134 into the desired structured light pattern. In some implementations, the diffractive optical element 130 is static. For example, the diffractive optical element 130 may focus exiting light to a single depth of focus. As another example, the diffractive optical element 130 may have a particular diffractive surface pattern or surface relief profile that results in diffraction of exiting light to form the desired structured light pattern.

In other implementations, the diffractive optical element 130 enables dynamic focus modulation (i.e., one may switch on and off different diffractive patterns to impart various different focuses to the exiting light). As one example, the diffractive optical element 130 can feature a polymer dispersed liquid crystal approach wherein a host medium, such as a polymeric material, has microdroplets of liquid crystal dispersed within the material; when a voltage is applied, the molecules reorient so that their refractive indices no longer match that of the host medium, thereby creating a high-frequency switchable diffraction pattern.

However, in other implementations, projector 130 includes components other than diffractive optical element 132 for the purposes of transforming emitted light into the desired structured light pattern. For example, projector 130 can include a chrome-on-glass slide, a refractive lens (e.g., Fresnel lens), a spatial light modulator (e.g., digital light processing), and/or other structures for generating the desired structured light pattern.

The image capture device 140 can be any device capable of capturing an image of at least a portion of the target region 150. The image can be a color image or can be an grayscale image. For example, the image capture device 140 can be one or more of many different types of cameras.

As an example, the image capture device 140 includes a number of lenses 142 that modify, redirect, and/or focus light entering the image capture device through an aperture. A light sensor 144 receives the light that passes through the lenses 142 and outputs data representative of a plurality of pixels of an image. For example, the data provides an intensity value for each pixel.

The image capture device 140 can also include a synchronization signal output 148 communicatively coupled to the synchronization signal input 138 of the projector. The synchronization output 148 provides a synchronization signal to the synchronization signal input 138. The projector 130 uses the synchronization signal to pulse the structured light pattern synchronously with an exposure time or exposure period of the image capture device 140. As an example, the synchronization signal output 148 and the synchronization signal input 138 can be portions of a Genlock hardware trigger system.

Network 105 can be any type of communications network, such as a local area network (e.g., intranet), a wide area network (e.g., Internet), an internal device bus, or some combination thereof and can include any number of wired or wireless links. In general, communication between the components of system 100 via network 105 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In further implementations, the system 100 includes two or more projectors at different locations relative to the image capture device 140. The projectors pulse the pattern in an alternating fashion. Depth values that are inconsistent across processing performed with respect to multiple projectors are removed or ignored. Such multiple projector system provides increased robustness against near-field occlusions.

Figure 2:
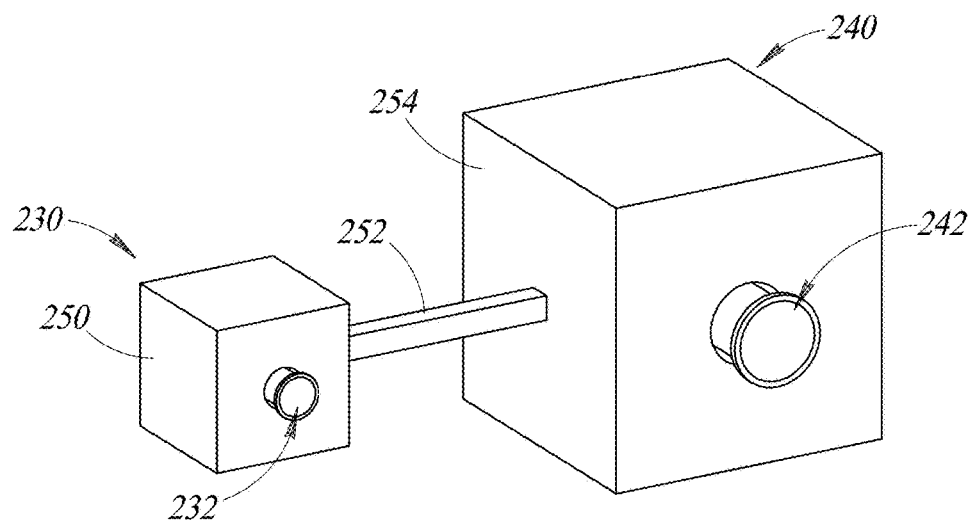
FIG. 2 is an isometric view of an example depth camera system with a separate, attachable projector, according to at least one illustrated embodiment.

FIG. 2 is an isometric view of an example depth camera system with a separate, attachable projector 230, according to at least one illustrated embodiment. The projector 230 is attachable/detachable to/from an image capture device 240.

The projector 230 has a light projection element 232 that includes, for example, the light source(s) 134, diffractive optical element 132, and/or other components discussed with reference to FIG. 1. A housing 250 of the projector 230 encloses the projector components.

The image capture device 240 includes one or more lenses 242 positioned within an aperture. A housing 254 of the image capture device 240 encloses the image capture device components.

The light projection element 232 of the projector 230 is located a baseline distance away from the lenses 242 of the image capture device 240.

In some implementations, as shown in FIG. 2, the projector 230 includes an arm 252 that attaches to the image capture device 240. In some implementations, a length of the arm 252 is adjustable to adjust the baseline distance between the projector 230 and the image capture device 240. In other implementations, the projector 230 does not include the arm 252 and, instead, the housing 250 of the projector 230 is directly attachable to the housing 254 of the image capture device.

In some implementations, the location of the light projection element 232 of the projector 230 is movable relative to the housing 250 of the projector 230. For example, the light projection element 232 can be slidable along a track or guide, for example, to adjust the baseline distance.

As one particular example, in some implementations, the image capture device 240 is a smartphone or tablet computing device and the projector 230 is operatively connectable to the smartphone or tablet computing device via insertion of a data connector of the projector 230 into a data port of the smartphone or tablet. For example, the projector 230 may be pluggable into a headphone jack, USB port, or other data port of a smartphone or tablet computing device. Alternatively, the projector 230 may be physically attachable to the smartphone or tablet computing device but communicate with the smartphone or tablet via a wireless communication protocol.

Attachment of the projector 230 to a smartphone or tablet computing device with a two-dimensional camera may advantageously transform the smartphone or tablet computing device into a depth camera system. Such depth camera system can implement the particular teachings of the present disclosure or can perform other depth camera techniques.

In some implementations, the projector 230 includes a non-transitory memory storing processor-executable instructions and/or one or more circuits that control operation of the projector 230 including, for example, performing a calibration routine. In particular, the projector 230 may perform the calibration routine to infer an actual baseline between the projector 230 and the image capture device 240. The calibration routine may include capture of two reference images at two depths after attachment of the projector 230 to the image capture device 240. Such calibration routine may be particularly advantageous when the baseline distance between the projector 230 and the image capture device 240 is adjustable.

In other implementations, processor-executable instructions that control operation of the projector 230 may be downloadable (e.g., from an online application marketplace) or installable with respect to the image capture device 240 or a computing device associated with the image captured device 240.

Figure 4:
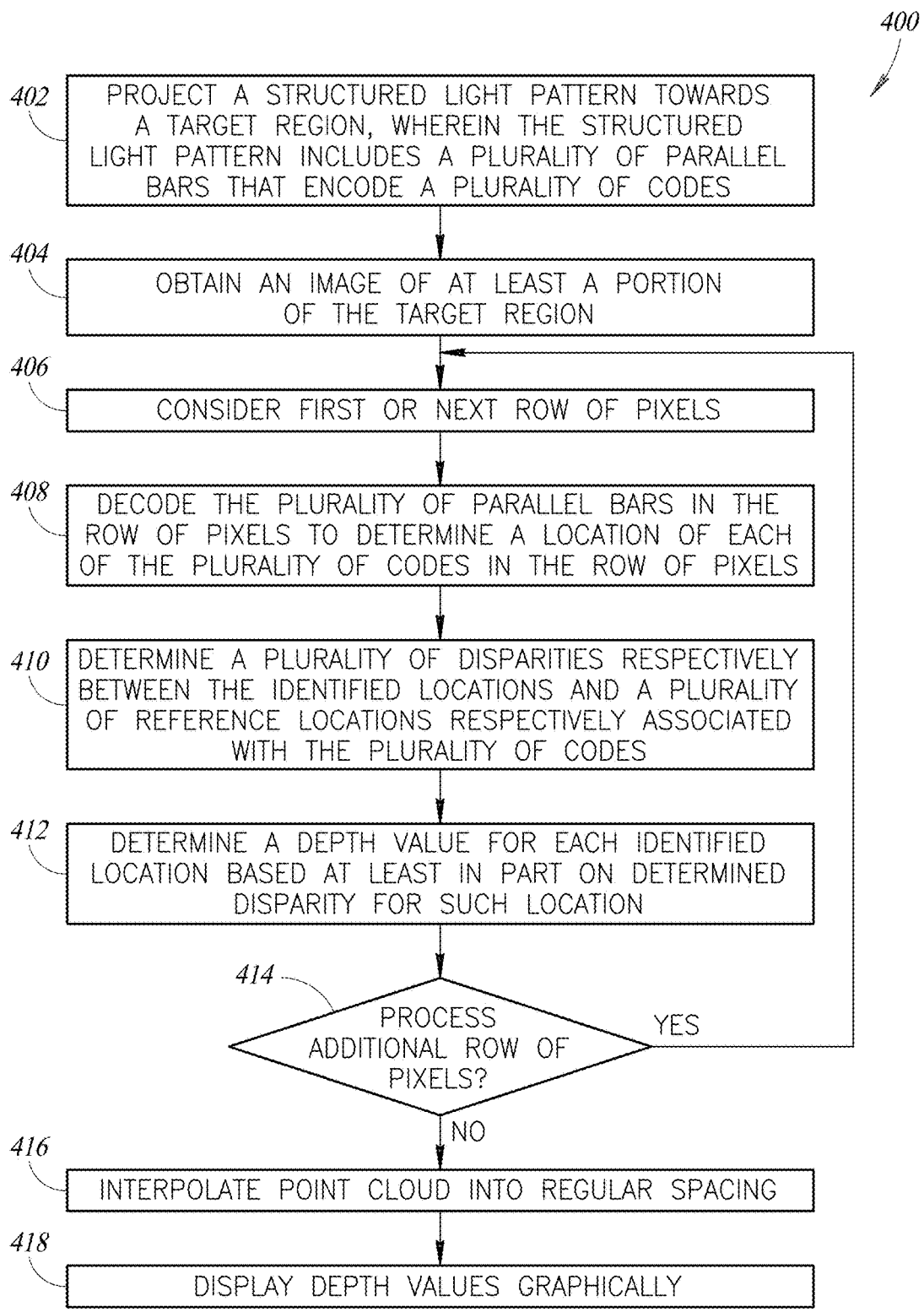
FIG. 4 is a flow chart diagram of an example method to determine depth values, according to at least one illustrated embodiment.

Referring now to FIG. 4, FIG. 4 is a flow chart diagram of an example method 400 to determine depth values, according to at least one illustrated embodiment. Although method 400 will be discussed with reference to system 100 of FIG. 1, any structured light depth camera system can perform the method 400. Method 400 begins at 402.

At 402, the projector 130 projects a structured light pattern towards the target region 150. The structured light pattern includes a plurality of parallel bars that encode a plurality of codes.

Figure 3:
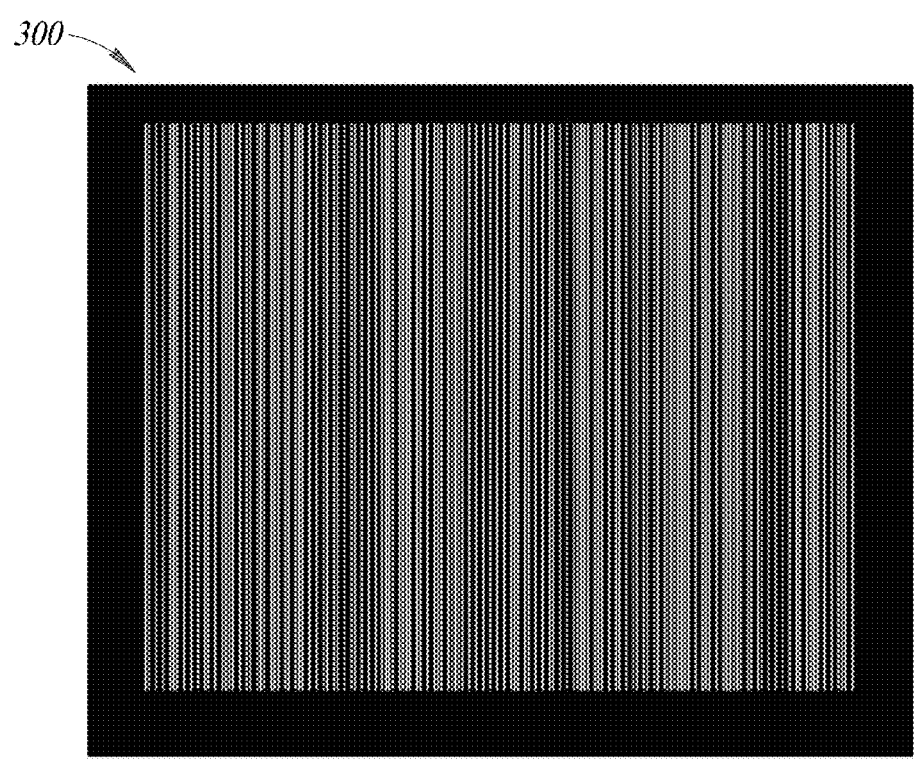
FIG. 3 shows an example structured light pattern that includes a plurality of parallel bars, according to at least one illustrated embodiment.

As an example, FIG. 3 shows an example structured light pattern 300 that includes a plurality of parallel bars, according to at least one illustrated embodiment. The plurality of parallel bars encode a plurality of codes.

In particular, due to the parallel nature of the plurality of bars, the plurality of parallel bars encode the plurality of codes at the same respective locations for each of plurality of rows that are transverse to the parallel bars. As such, a system decoding the pattern 300 can perform row by row processing n a uniform fashion, thereby reducing processing complexity.

The pattern 300 can encode any number of different codes in different fashions. For example, the codes can include codes based on the Universal Product Code (UPC), the Gray code, or other codes. The codes can be binary or non-binary and can be overlapping or non-overlapping.

In the particular example pattern 300 of FIG. 3, the plurality of parallel bars encode a binary de Bruijn sequence of order n and k=2, where n is a positive integer. The de Bruijn sequence is a circular sequence of order n and features $k^n$ codes in the sequence.

According to an aspect of the present disclosure, the order n can be selected to achieve a desired spatial resolution of the depth camera system 100. As an example, a binary de Bruijn sequence with n=7 and k=2 provides 128 unique codes. The length of each code in the sequence is the order n (which is 7 in the present example). In order to ensure that the sequence is non-circular, the first 7 bits of the sequence can be repeated at the end, leading to a sequence of 135 bits.

Every one of the possible 128 codes of 7 bits long are uniquely represented in this 135 bit sequence. In particular, the 128 codes are overlapping, with each sequential bit in the first 128 bits representing the first bit in the next sequential code. The 135 bit sequence can be encoded using a number of different encodings to obtain a coded structured light pattern such as, for example, pattern 300 of FIG. 300.

The depth camera system 100 projects the resulting pattern onto a target region that is within a field of view of the system 100, as discussed above with respect to 402 of FIG. 4. In one example application, the target region includes one or more objects (e.g., objects that may be purchased in a retail store). Such objects typically have varying shapes and have a variety of printing or labels thereon (e.g., one or more machine-readable symbols). The local reflectance of these objects varies markedly across the surface of the object. The intensity of reflection from an object when illuminated by a structured light pattern is the product of the intensity of the pattern and the reflectance profile of the object. In view of such, the reflectance of the object can be represented as multiplicative noise introduced onto the projected pattern, similar to the speckle effect from lasers. Therefore, the sequence can be encoded using an encoding of the present disclosure that is resistant to such noise sources.

Figure 5:
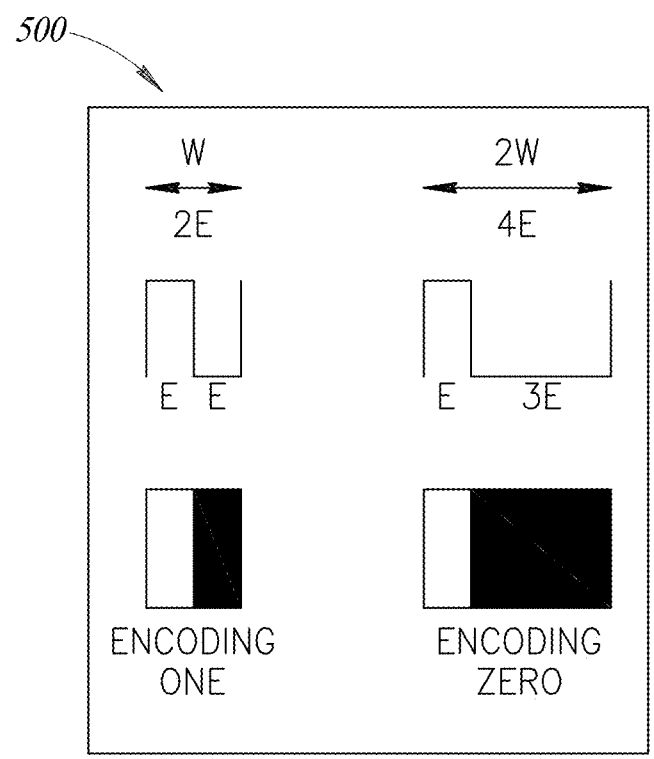
FIG. 5 is a graphical diagram of an example encoding, according to at least one illustrated embodiment.

As an example, FIG. 5 is a graphical diagram of an example encoding of the present disclosure, according to at least one illustrated embodiment. In particular, FIG. 5 illustrates an example spatial frequency modulation encoding that can be used to encode a plurality of codes such as, for example, the binary de Bruijn sequence discussed above.

The illustrated technique encodes each one (1) value within the sequence to be encoded as (10), where 1 corresponds to a lit element of width E (e.g., lit bar), and 0 corresponds to a dark element of width E (e.g. dark space). Each zero (0) value within the sequence to be encoded as (1000), where 1 corresponds to the lit element of width E and the 000 corresponds to a dark element of width 3E.

Figure 6:
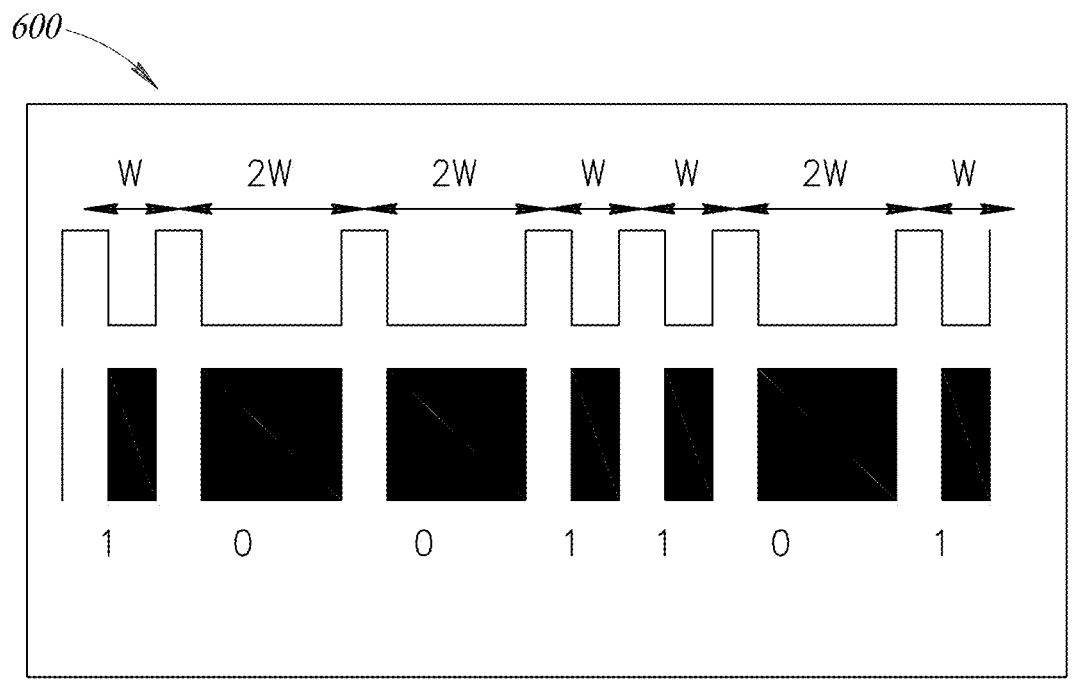
FIG. 6 is a graphical diagram of a plurality of bars that encode a code, according to at least one illustrated embodiment.

Thus, the encoding of the 0 value in the sequence results in an encoded element that has a width 2W that is twice the width W of the encoded element representative of the 1 value. Furthermore, the illustrated encoding scheme uses only narrow bars (i.e., lit elements) of a uniform width E and spaces of two different widths E and 3E. As an example, FIG. 6 is a graphical diagram of a plurality of bars that encode the 7 bit code 1001101.

In some implementations, they depth camera system 100 actively encodes or otherwise generates one or more coded structured light patterns while the system 100 is in operation.

In other implementations, the system 100 simply projects a predetermined and/or previously stored pattern when the system 100 is in operation. As one example, the projector 130 of FIG. 1 can project the pattern 300 of FIG. 3 at each instance in which the projector 130 illuminates the target region 150. The projector 130 can include software and/or hardware (e.g., the diffractive optical element 132) that are specifically designed to result in projection of the pattern 300 whenever the light source(s) 134 of the projector emit light.

Furthermore, although the structured light pattern is discussed herein as including lit bars (e.g., formed by emission of light from the projector) and dark spaces (e.g., formed by the absence of light from the projector), other types of elements can form the structured light pattern in addition or alternatively to such lit bars and dark spaces. In particular, any first and second elements that respectively have first and second reflectance properties that result in perceptively different reflectance profiles by the target region can form the structured light patterns. As examples, such first and second elements may include different colors or color combinations, different sub-patterns of light, different wavelengths of light, or other perceptively different properties. In addition, although the plurality of bars of the structured light pattern are discussed herein as being parallel, such term should not be interpreted as requiring exact mathematical precision, but instead as conveying a general relationship.

Figure 8:
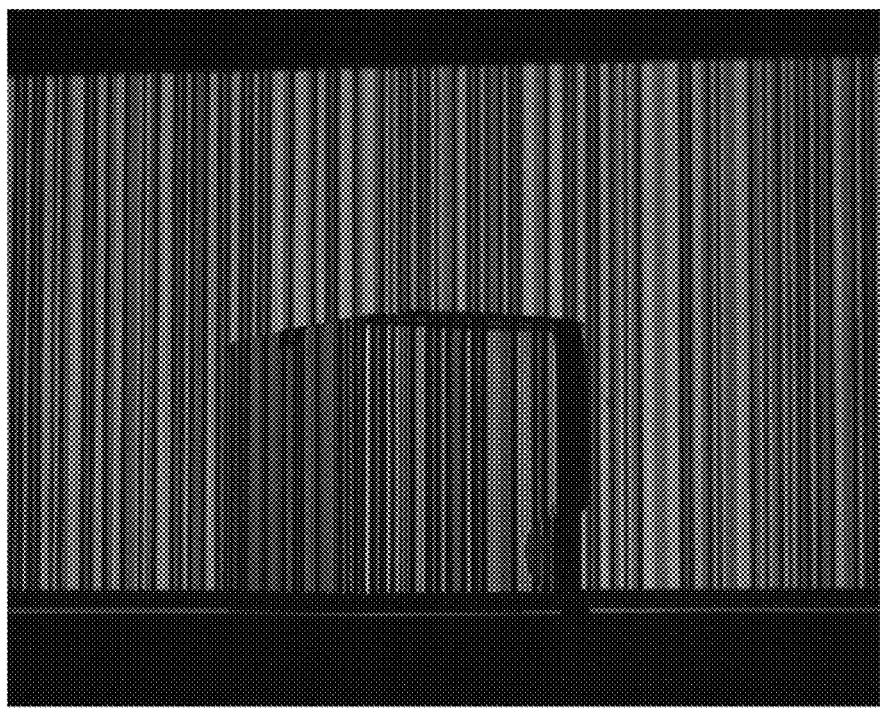
FIG. 8 shows an example captured image of a target region containing an object with a structured light pattern projected thereon, according to at least one illustrated embodiment.

Referring again to FIG. 4, at 404, the image capture device 140 captures an image of at least a portion of the target region 150 while the target region 150 is illuminated with the structured light pattern. The image can include a plurality of pixels representative of at least a portion of the structured light pattern. As an example, FIG. 8 shows an example captured image 800 of a target region containing an object with a structured light pattern projected thereon, according to at least one illustrated embodiment. In particular, image 800 depicts an angled box within the target region.

Figure 7:
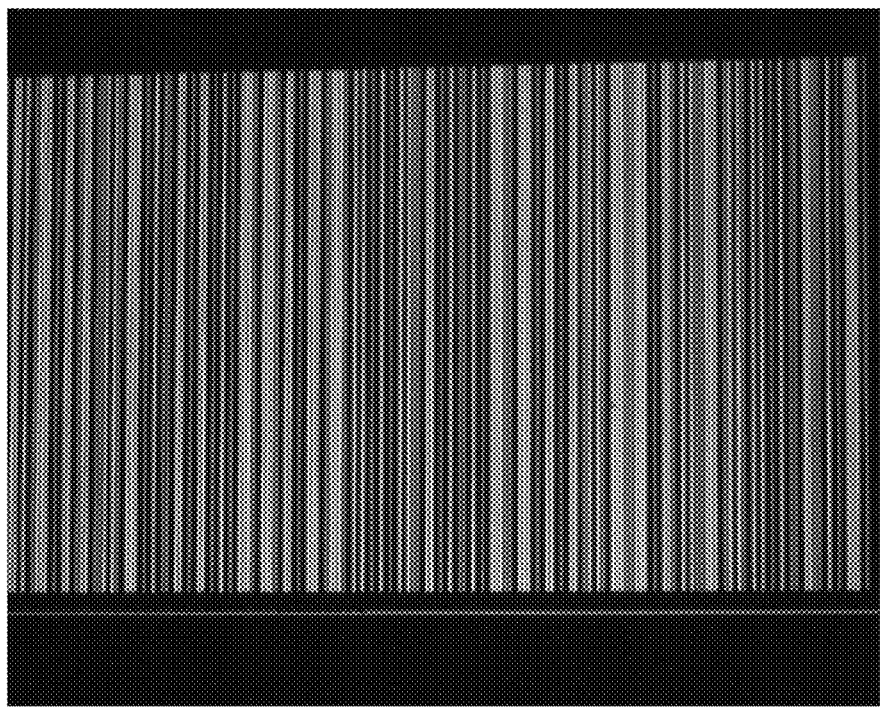
FIG. 7 shows an example reference image of a reference target with a structured light pattern projected thereon, according to at least one illustrated embodiment.

As another example image, FIG. 7 shows an example reference image 700 of a reference target with a structured light pattern projected thereon, according to at least one illustrated embodiment. In some implementations, the reference image 700 may have been previously captured and analyzed at some point prior to performance of the method 400 by system 100. The manner in which system 100 uses reference image 700 and captured image 800 will be discussed further below.

Referring again to FIG. 4, after the system 100 obtains the image at 404, at 406, the system 100 considers the first or next row of pixels of the image. More particularly, system 100 can process or otherwise consider a plurality of rows of pixels of the image on a row-by-row basis. Thus, at the first instance of 406, the system 100 considers the first row of pixels. At subsequent instances of 406, the system considers the respective next sequential row of pixels. Generally, the rows of pixels are transverse to the plurality of parallel bars represented in the image. Furthermore, although the system 100 is discussed as processing the rows of pixels in a sequential manner, in other implementations, the system 100 processes the rows in a parallel manner using parallel computing techniques.

In some implementations, the system 100 processes each row of pixels of the image. In other implementations, the system 100 skips a predetermined number of rows before processing another row of pixels. Generally, selection of the number of rows to be skipped balances various factors including processing time or cost, resolution of the resulting depth map or range image, expected size of objects to be ranged/detected, and/or other considerations.

As an example, for a de Bruijn sequence of order n and k=2, there are $2^n$ codes and $Q=2^n+n$ bits in the unrolled bit pattern. For n=7, as discussed particularly above, there are 135 locations along each row (maximum) in which a location of a code can be identified and therefore a depth value may be computed. As such, the system 100 could analyze every row of pixels, in principle, to yield a set of depth values. However, in some implementations, for a captured image of N×M pixels, the system 100 skips a set number of rows such that the final spatial resolution is equally spaced in the X and Y directions. For example, the horizontal spacing is N/Q pixels per bit. Therefore, in some implementations, the system 100 subsamples the rows of pixels such that every N/Q row is processed.

As one particular example, if the image capture device 140 of system 100 captures images of 1280×1024 pixels and the corresponding structured light pattern has order n=7, corresponding to Q=135, the horizontal spacing is 9.5 pixels per bit. Therefore, in such particular example, the system 100 may sample or otherwise process every tenth row of pixels at 406 of method 400, thereby resulting in a relatively even X and Y spatial resolution.

However, in other implementations, the X and Y resolution of the resulting depth map or range image is not necessarily even or uniform. For example, the system 100 can perform non-uniform row sampling if desired (e.g., if a greater resolution is desired for certain portions of the target region in which objects are expected to be located).

Referring again to FIG. 4, at 408, the system 100 decodes the plurality of parallel bars in the present row of pixels to determine a location of each of the plurality of codes in the row of pixels. The system 100 can perform any number of different techniques to decode at 406 the plurality of parallel bars represented in the row.

Figure 9:
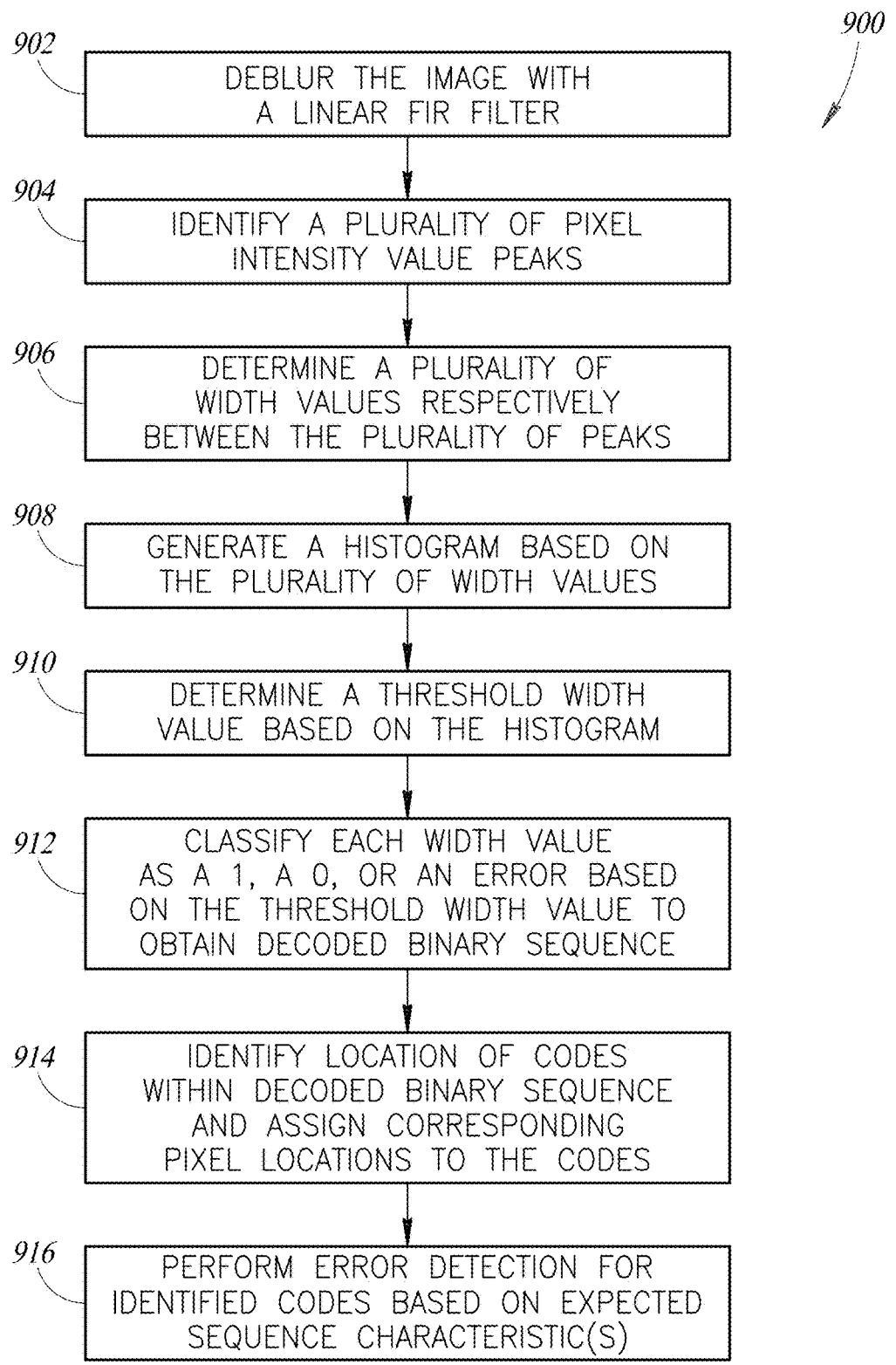
FIG. 9 is a flow chart diagram of an example method to decode a structured light pattern that includes a plurality of bars, according to at least one illustrated embodiment.

As an example, FIG. 9 is a flow chart diagram of an example method 900 to decode a structured light pattern that includes a plurality of bars, according to at least one illustrated embodiment. Although method 900 will be discussed with reference to system 100 of FIG. 1, any structured light depth camera system can implement the method 900. Method 900 begins at 902.

At 902, the system 100 deblurs the row of pixels with a linear finite impulse response (FIR) filter. In other implementations, the system 100 deblurs the entire captured image prior to performing row-by-row processing. In other implementations, the system 100 does not perform any deblurring or filtering of the image.

More particularly, depth camera systems typically operate over a significant depth of field. Therefore, the projector 130 of the system 100 can project the structured light pattern with acceptable blur characteristics and the image capture device 140 can view the target region and capture an image without excessive blurring. Thus, in some implementations, the projector 130 and the image capture device 140 have the same f/# so that they project and image to the same distance, splitting the blurring evenly between transmission and reception.

However, operation over a large depth of field implies a relatively small aperture (i.e., large f/#), which is typically optically inefficient. As such, the system 100 can deblur the image at 902 to assist in extending the depth of field without reducing the optical efficiency. As an example, the system 100 may deblur the image at 902 using a linear FIR deblurring equalizer.

Furthermore, the system 100 can minimize the baseline with respect to the minimum object distance, thereby causing the measured width of narrow bars to be nearly constant. Under such conditions, the system 100 can use a fixed equalizer to deblur the image at 902. A linear FIR is sufficient since the blur in the vertical axis is typically relatively unimportant. Furthermore, the projection and/or imaging lens of the system 100 can have a large aspect ratio (e.g., narrow but tall) to maximize optical efficiency without affecting lateral resolution.

Figure 10:
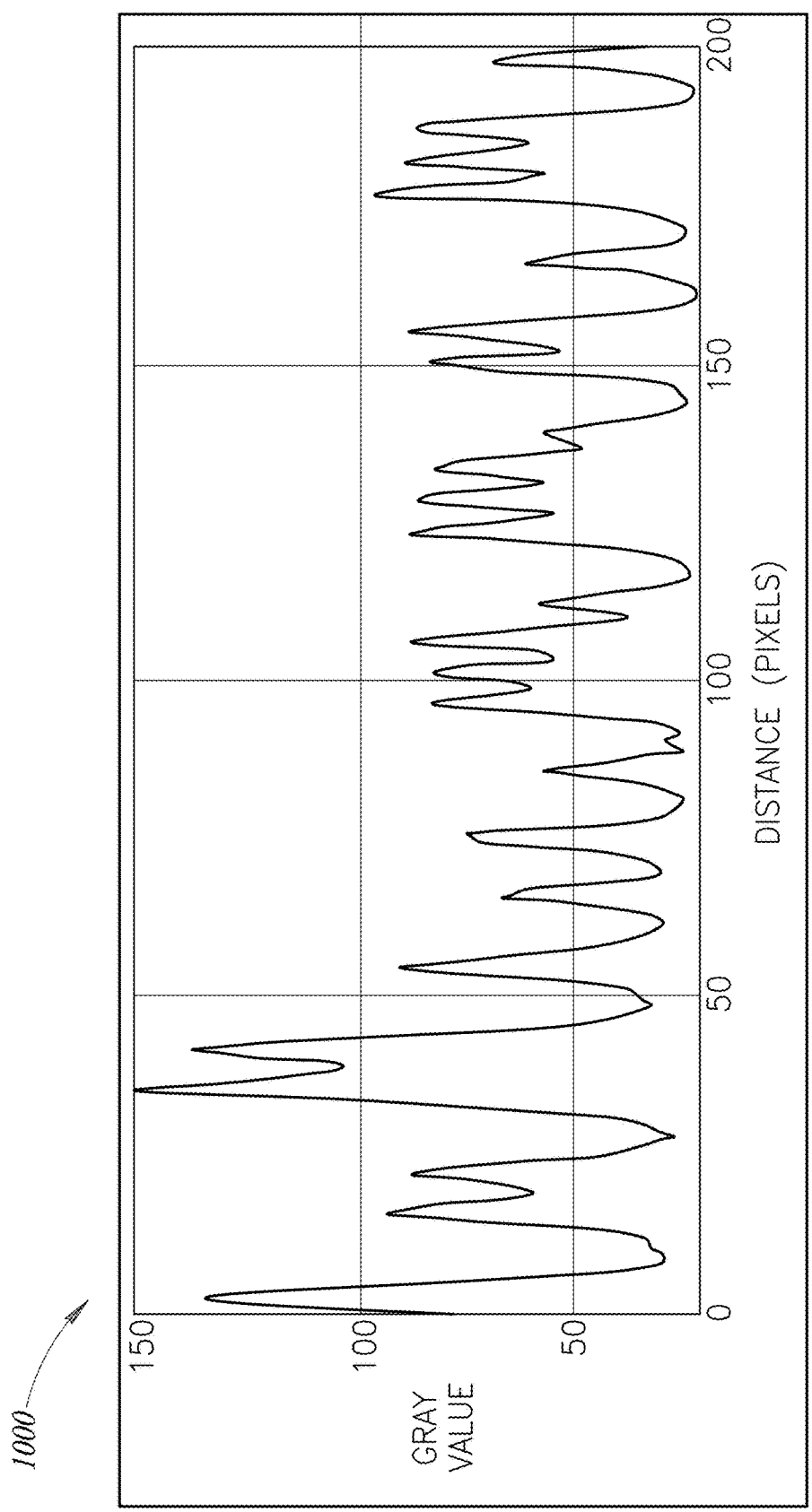
FIG. 10 is an example graph of pixel intensity values, according to at least one illustrated embodiment.
Figure 11:
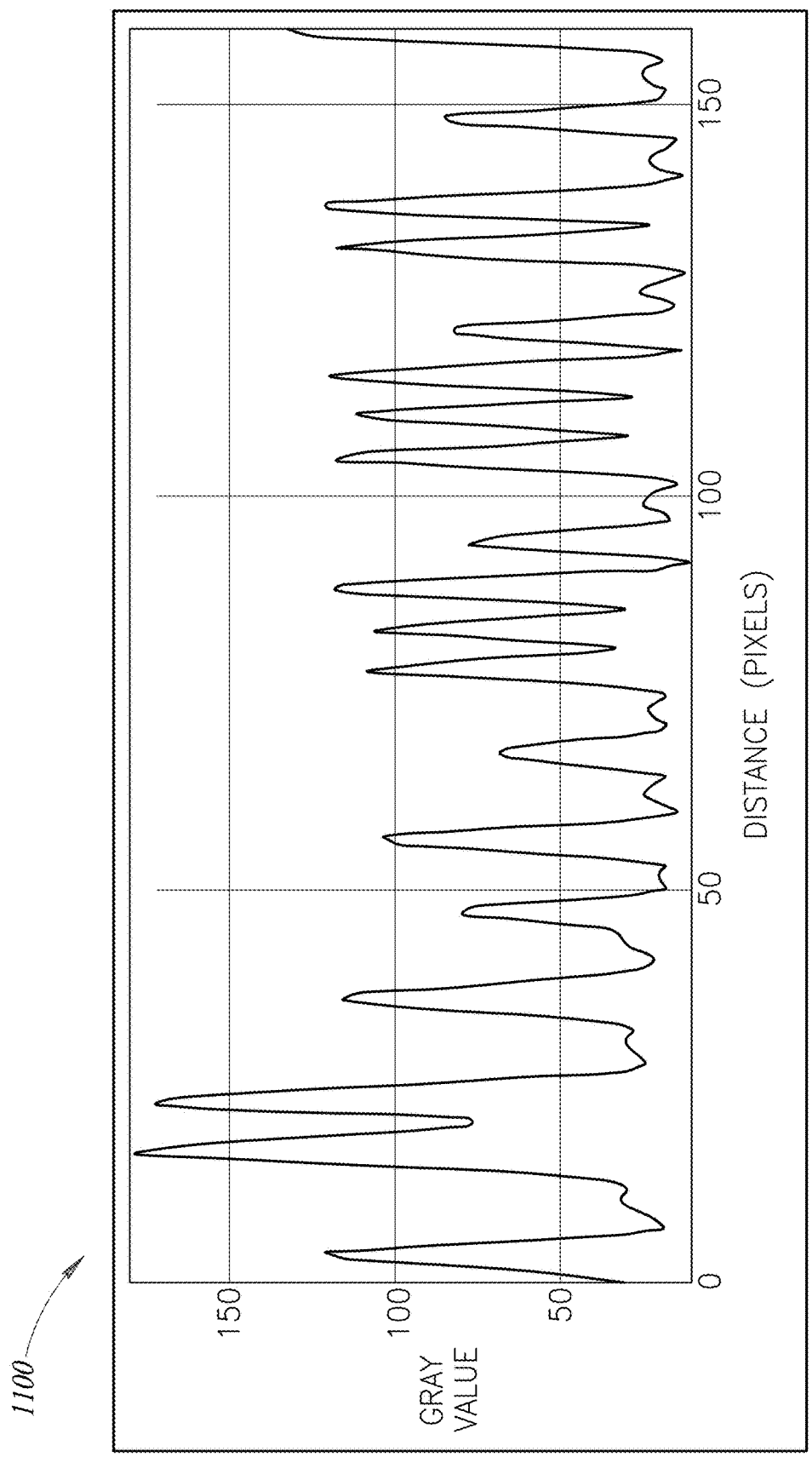
FIG. 11 is an example graph of pixel intensity values after performance of a deblurring technique, according to at least one illustrated embodiment.

As one example, FIG. 10 is an example graph 1000 of pixel intensity values for a row of pixels prior to performance of a deblurring technique, according to at least one illustrated embodiment. FIG. 11 is an example graph 1100 of pixel intensity values for the row of pixels after performance of a deblurring technique, according to at least one illustrated embodiment. In particular, graph 1100 shows pixel intensity values after two passes of the linear filter [−1 1 3 1 −1] across the profile in graph 1000 to deblur the pixel intensity values. As a result, the peaks in the profile of graph 1100 are more pronounced.

Referring again to FIG. 9, at 904, the system 100 identifies a plurality of pixel intensity value peaks within the row of pixels. The system 100 can identify the peaks according to many different peak finding techniques, including for example, identifying local maximums within a moving window of a length that is based on expected element widths. As another example, at 904, the system 100 can identify the plurality of pixel intensity value peaks by performing a peak finding algorithm disclosed in U.S. Pat. No. 7,506,816, which is issued to the same inventor as the present disclosure. U.S. Pat. No. 7,506,816 is hereby incorporated by reference in its entirety.

Figure 12:
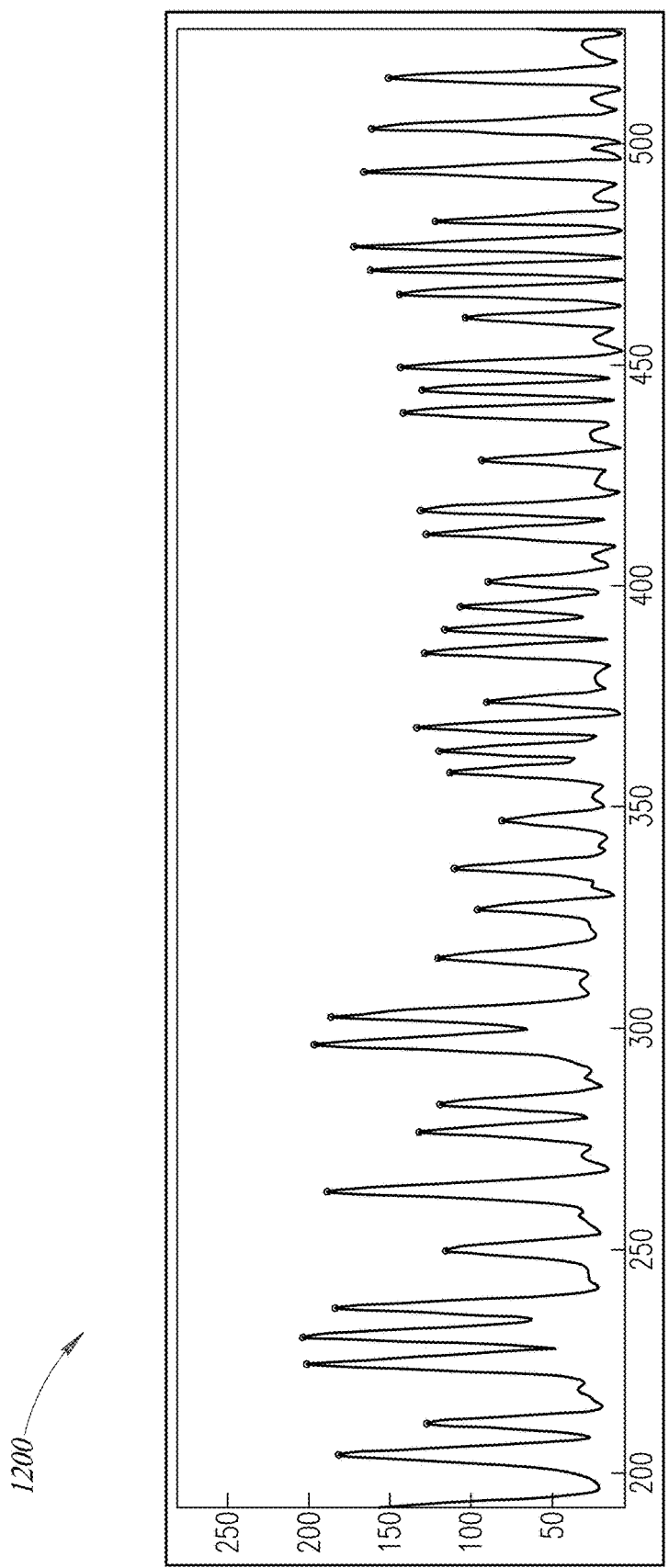
FIG. 12 is an example graph of pixel intensity values showing identified pixel intensity value peaks, according to at least one illustrated embodiment.

As one example, FIG. 12 is an example graph 1200 of pixel intensity values for the row of pixels showing identified pixel intensity value peaks, according to at least one illustrated embodiment. In particular, the identified pixel intensity value peaks are graphically indicated with a plurality of dots.

Referring again to FIG. 9, at 906, the system 100 determines a plurality of width values respectively between the plurality of peaks identified at 904. For example, a simple difference in measured pixel position can be determined between the location of each peak and its respective previous sequential peak. For correctly imaged codes, the determined width values will generally correspond to W and 2W, as illustrated in FIG. 5.

After the system 100 determines the width values at 906, the system 100 binarizes the width values to obtain a decoded sequence for the row of pixels. The system 100 can binarize the width values according to various techniques, including the example binarization technique provided by 908-912 of method 900.

Figure 13:
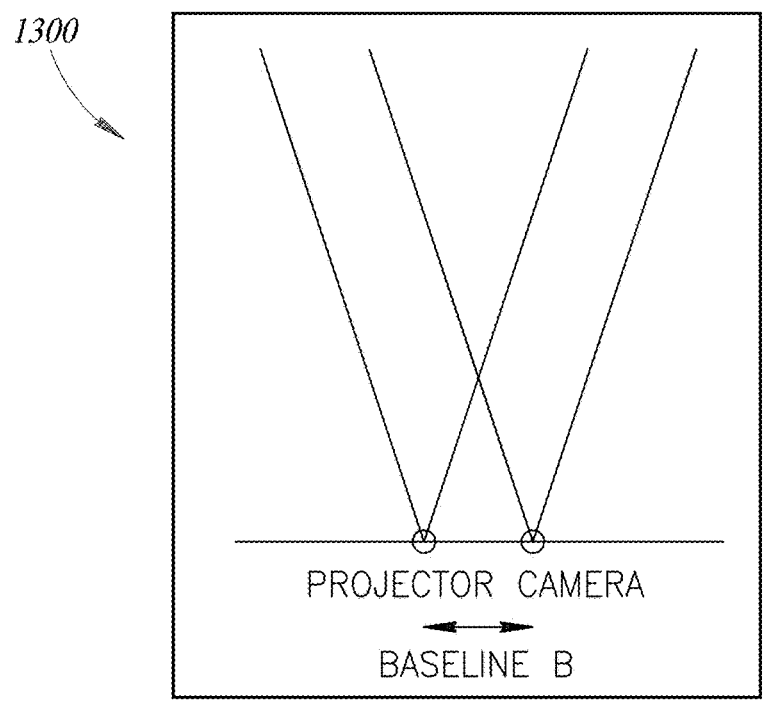
FIG. 13 is a graphical diagram of a field of view of an example depth camera system, according to at least one illustrated embodiment.

Binarization of the width values can be complicated by variations in the element widths versus distance from the depth camera system. In particular, the measured widths may vary in width versus distance from the image capture device, depending on the geometry of the system. As an example, FIG. 13 is a graphical diagram 1300 of a field of view of an example depth camera system, according to at least one illustrated embodiment.

As shown in diagram 1300, the projector and camera are arranged laterally at a separation baseline distance B. For objects located at distances far from the depth camera system (that is, relative to the baseline distance B), the respective distances from the object to the projector and the camera, respectively, are nearly identical. At such distances, the captured width of a projected pattern feature of width E is nearly independent of distance.

Figure 14:
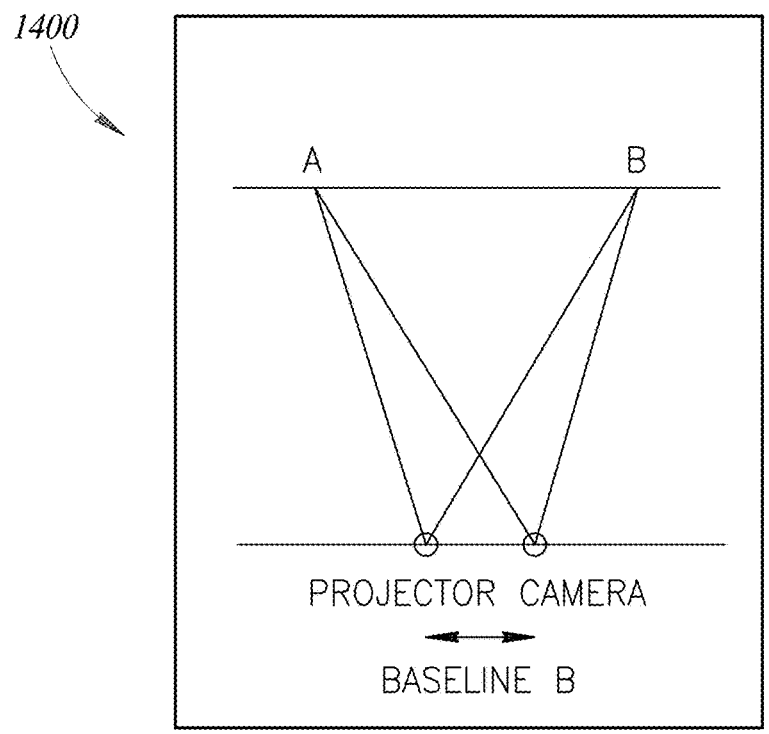
FIG. 14 is a graphical diagram of a field of view with respect to close range objects of an example depth camera system, according to at least one illustrated embodiment.

However, at close distances (e.g., distances comparable to the baseline distance B) the captured width of the projected feature of width E depends on the location of the feature in the field of view. As an example, FIG. 14 is a graphical diagram 1400 of a field of view with respect to close range objects of an example depth camera system, according to at least one illustrated embodiment. The captured width of elements that are located relatively on the projector side (A) will be seen as smaller than on the camera side (B), since the distance from the projector to an object at (A) is smaller than the distance from the camera to the object at (A). Thus, the projected feature on (A) will be smaller and the magnification by the camera will be larger, both of which combine to make the captured image width at (A) smaller than at (B). Likewise, the captured width of elements located relatively at (B) will be larger than at (A). Thus, binarizing of widths should be robust against such expected variations, and can be achieved as provided by 908-912 of method 900.

Referring again to FIG. 9, at 908, the system 100 generates a histogram based at least in part on the plurality of width values determined at 906. At 910, the system determines a threshold width value based on the histogram.

As an example, for a structured light pattern that encodes a particular sequence (e.g., the example de Bruijn sequence discussed above), the maximum number of sequential ones or zeros represented in the pattern depends upon the particular sequence encoded. Suppose that this value is M. If a sequence of $M_{Prime}=M+\delta$, where $\delta$ is a small integer, measured widths is histogrammed, there will be guaranteed some elements of width W and some elements of width 2W. The system 100 can use such a histogram to determine a threshold width value T that clearly separates the narrow elements of width W from the wide elements of width 2W.

Figure 15:
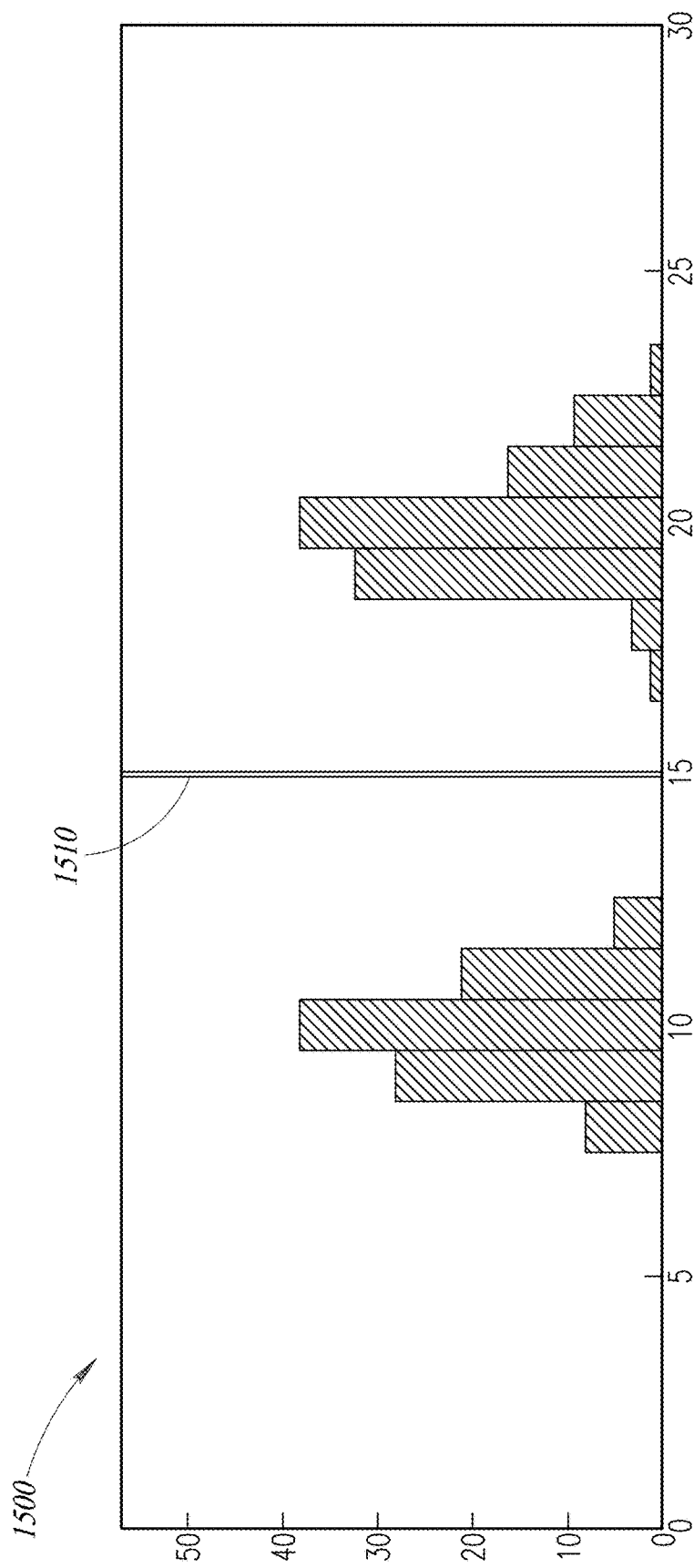
FIG. 15 is an example histogram of width values and an example threshold width value, according to at least one illustrated embodiment.

As an example, FIG. 15 is an example histogram 1500 of width values, according to at least one illustrated embodiment. A vertical bar 1510 in FIG. 15 shows a determined threshold width value that clearly separates the narrow elements from the wide elements.

However, large outlier width values (e.g., due to occlusions from near objects) may potentially skew a histogram of the width values and negatively impact threshold selection. Therefore, according to an aspect of the present disclosure, the system 100 may generate a histogram at 908 that includes a sequence of $M_{Prime}$ elements combined with the same sequence of $M_{Prime}$ elements with their widths divided by two. As a result, an element of width W will be represented in the histogram as width W and width W/2. An element of width 2W will be represented in the histogram as width 2W and width W. As such, there will always be an excess of element width W in the resultant histogram, since the sequence $M_{Prime}$ guarantees some wide and narrow elements. Therefore, even given a variety of widths, the majority of widths will be centered about W in the histogram and measurement of the median of these values yields an improved estimate of element width W, which may be referred to as $W_{Estimate}$. The threshold width value is easily calculated once the estimate is known. As one example, T may equal $W_{Estimate}$ times 1.5.

Figure 16:
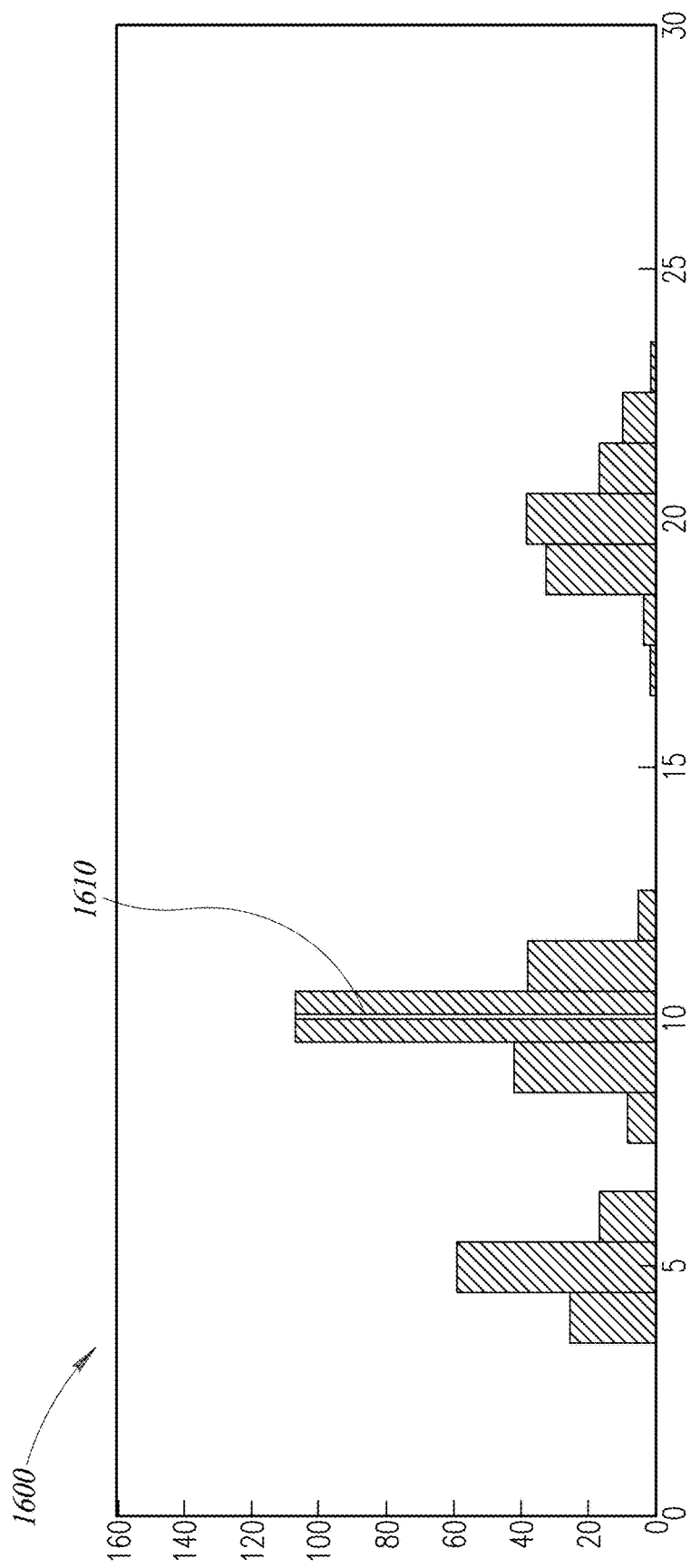
FIG. 16 is an example histogram of width values and an example threshold width value, according to at least one illustrated embodiment.

As an example, FIG. 16 is an example histogram of width values, according to at least one illustrated embodiment. In particular, Histogram 1600 represents the width values of histogram 1500 of FIG. 15 in combination with the width values of histogram 1500 divided by two. A threshold width value is shown by bar 1610.

Referring again to FIG. 9, in some implementations of the present disclosure, at 910, the system 100 determines a different threshold width value for each width value. For example, in some implementations, determining the threshold width value at 910 includes generating a rolling threshold width value based on a moving window that spans, for example, two times a code length associated with the plurality of codes. For example, the moving window may span 14 width values if the code length is 7 bits. For each width value, the system 100 identifies the median of the corresponding moving window and multiplies such median by 1.5 to obtain the threshold width value for such width value.

Figure 17:
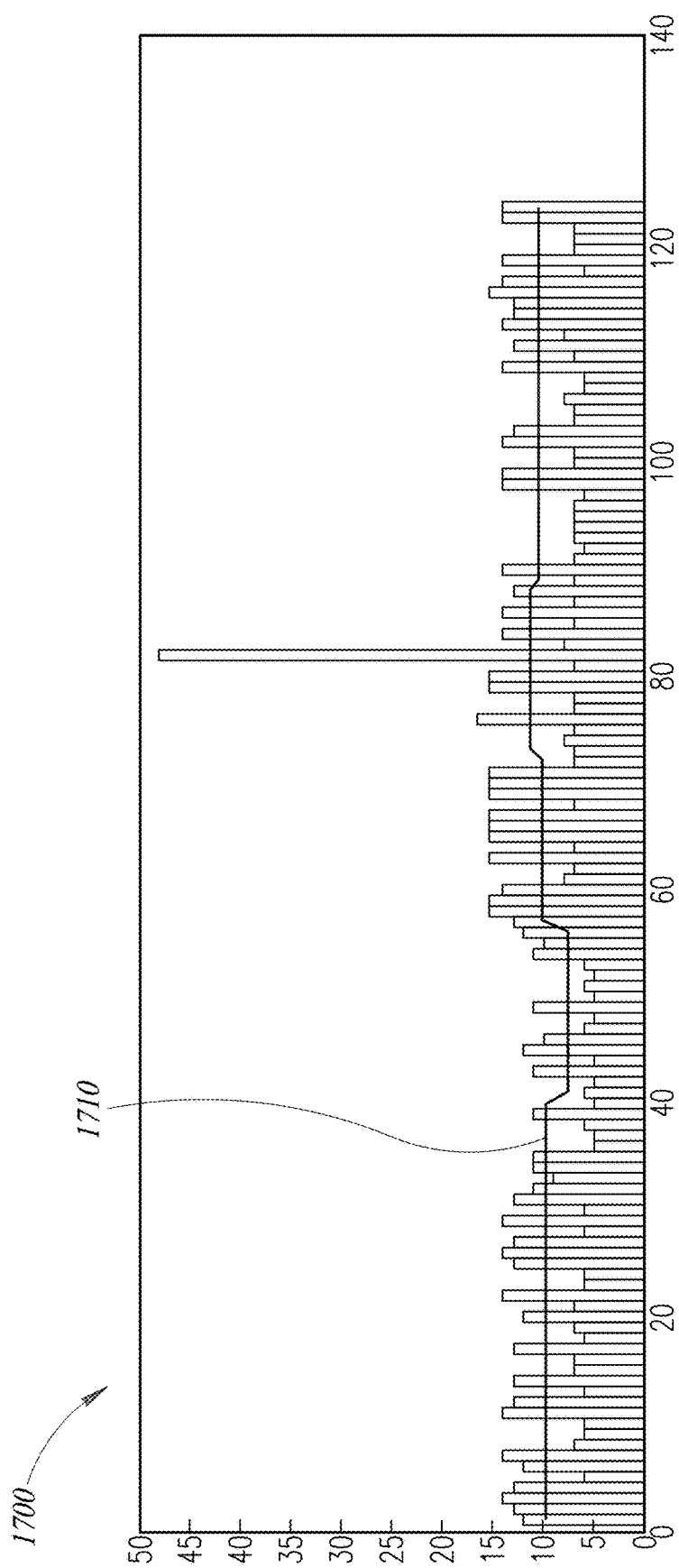
FIG. 17 is an example graph of width values and a rolling binarization threshold, according to at least one illustrated embodiment.

As an example, FIG. 17 is an example graph 1700 of width values, according to at least one illustrated embodiment. The graph 1700 shows a plot 1710 of the rolling binarization threshold, as well.

Referring again to FIG. 9, at 912, the system classifies each width value as a 1, a 0, or an error based on the threshold width value. Through such classification, the system transforms the plurality of width values into a decoded binary sequence.

As one example, if $W_i$ is less than T, then the system 100 can classify $W_i$ (and the corresponding pattern element) as a 1. If $W_i$ is greater or equal to T, then the system 100 can classify $W_i$ (and the corresponding pattern element) as a 0. As a further example, if $W_i$ is significantly smaller than W or significantly larger than 2W, it is probably due to an error (e.g., an occlusion) and the system 100 can classify $W_i$ as an error. In other implementations, system 100 performs error determination based on a comparison to the threshold value rather than W and 2W.

At 914, the system 100 identifies the locations of one or more of the codes within the decoded binary sequence. The system 100 can assign each location (e.g., the corresponding pixel location in the row) to the corresponding identified code. For example, the system 100 can aggregate or otherwise consider each sequential set of n bits within the decoded binary sequence to attempt to identify one of the plurality of codes encoded within the structured light pattern. The system 100 can compute or otherwise identify a new code for every advance of one bit within the decoded binary sequence.

Figure 18:
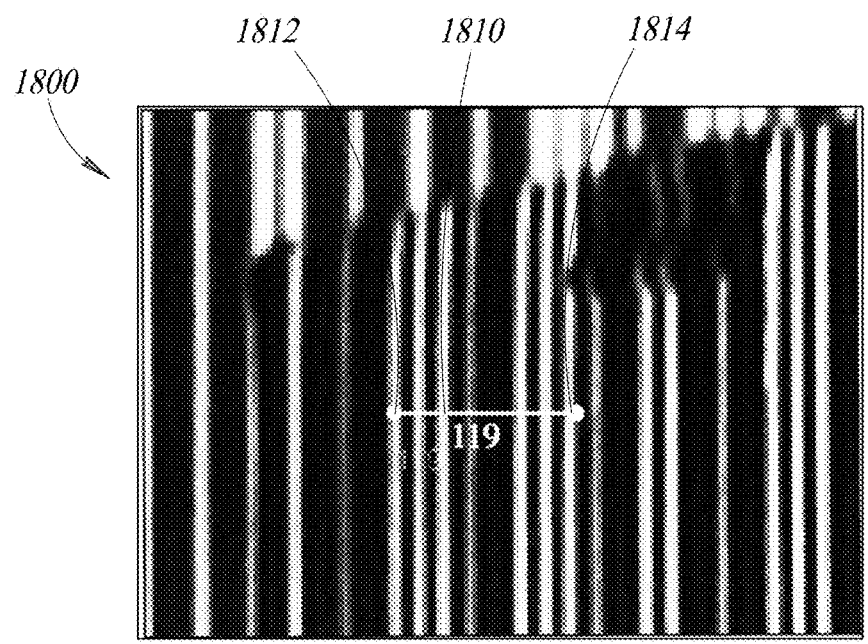
FIG. 18 shows the location of a decoded code within an example structured light pattern that includes a plurality of parallel bars, according to at least one illustrated embodiment.

As an example, FIG. 18 shows the location of a decoded code within an example structured light pattern 1800 that includes a plurality of parallel bars, according to at least one illustrated embodiment. In particular, line 1810 shows the location of the code within a row of the pattern 1800. A center of a first lit element representative of the code is shown at 1812. A trailing edge of a final lit element representative of the code is shown at 1814.

The identified code is represented by 3 narrow spaces, 1 wide space, and 3 narrow spaces, which correspond to a binary sequence 1110111 or the decimal value 119. In some implementations, the system 100 associates the pixel location 1812 of the first element of the code with the identified code (119). In other implementations, the pixel location 1814 of the last element, an average pixel location of all elements, and/or other locations can be associated with the particular identified code.

Referring again to FIG. 9, at 916, the system 100 performs error detection for the identified codes based at least in part on expected sequence characteristics for the codes. In particular, bit errors within the decoded binary sequence will result in identification of different, erroneous, and/or misplaced codes at 914.

According to an aspect of the present disclosure, the system 100 can detect erroneous codes by matching identified codes against a predefined or expected sequence. In particular, for example, the system 100 can store the sequence of codes to which the structured light pattern corresponds (e.g., the de Bruijn sequence) and can use the stored expected sequence to validate codes identified at 914. The system 100 can discard or otherwise ignore or not further process codes that are identified as erroneous.

As an example, if a sequence of two or more neighboring identified codes is compared to the expected code sequence, the system 100 can determine whether such neighboring code sequence is valid (e.g. is able to be located within the expected code sequence). The system 100 may perform other particular error detection techniques as well, including, for example, determining a confidence value for each code identified at 914 based on a first number of correct sequential relationships with other codes identified within the decoded sequence versus a second number of incorrect sequential relationships with other codes identified within the decoded sequence.

As another example, for an expected de Bruijn sequence of order n, a single bit error in the decoded binary sequence will result in n codes changing value. The portion of the decoded sequence containing the bit error will not match the expected sequence and, therefore, the system 100 can identify such portion of the decoded sequence.

The system 100 can ignore codes that do not follow or otherwise comply with the expected sequence. The codes identified as errors may result from occlusions in the image, low reflectivity of an object within the scene, or random noise. In some implementations, system 100 can supplement or replace gaps within the depth data using assumptions of depth continuity, such as, for example, linear interpolation of depth values between known points. In other implementations, system 100 retains gaps in the depth data as unknown data points.

Thus, method 900 of FIG. 9 provides one example method for decoding a structured light pattern that includes a plurality of parallel bars to determine a location of each of a plurality of codes encoded by the parallel bars. In particular, method 900 features novel and advantageous classification and error detection techniques.

Referring again to FIG. 4, after the system 100 decodes the plurality of parallel bars in the row of pixels to determine a location of each of the plurality of codes in the row of pixels at 408, then at 410, the system 100 determines a plurality of disparities respectively between the locations identified at 408 and a plurality of reference locations respectively associated with the plurality of codes. For example, the disparity can equal a signed difference between the location identified for each code at 408 and the respective reference location associated with such code.

More particularly, the system 100 may previously have determined or been provided with the plurality of reference locations respectively associated with the plurality of codes. For example, the system 100 may have previously analyzed (e.g., during a calibration routine or phase) a reference image that depicts a reference target (e.g., reference plane) displaced from the depth camera system 100 at a known distance and with the structured light pattern projected thereon. In particular, through analysis of a reference image that depicts the structured light pattern reflected from a known distance, the system 100 can obtain reference locations for each of the plurality of codes. The system can subsequently use the reference locations to compute at 410 disparities for codes identified in subsequent images and reflected from unknown depths.

In some implementations, the system 100 stores or determines a reference location for each code and for each row of pixels. In other implementations, the system 100 stores or determines a reference location for each code that is applicable to all rows of pixels, given the parallel nature of the plurality of bars. For example, the system 100 can determine the reference locations to be used for all rows of pixels based on the locations of codes within a middle row of pixels of the reference image.

Furthermore, in some implementations, the system 100 can adjust one or more of the determined disparities to offset a rotation between the projector 130 and the image capture device 140. For example, during calibration the system 100 can determine a twist angle between the projector 130 and the image capture device 140. The system 100 can determine one or more twist values based on the twist angle. At 410, the system 100 can adjust the determined disparities for certain locations by the one or more twist offset values.

As an example, in the instance in which the system 100 determines the reference locations to be used for all rows of pixels based on the locations of codes within a middle row of pixels of the reference image, the system 100 offsets disparities determined for rows of pixels above the middle row by twist values of a certain sign while the system 100 offsets disparities determined for rows of pixels below the middle row by twist values of an opposite sign. Furthermore, the magnitude of the twist value used for a given location within a given row can be proportional to the absolute distance between such given row and the middle row.

Figure 19:
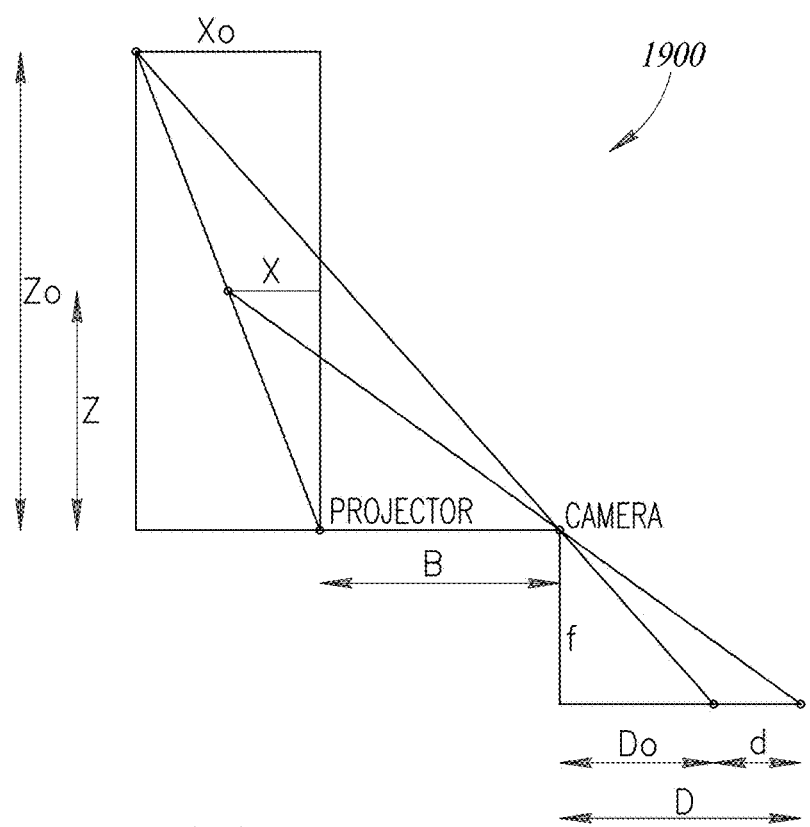
FIG. 19 is a graphical diagram of triangulation geometry, according to at least one illustrated embodiment.

At 412, the system 100 determines a depth value for each identified location based at least in part on the determined disparity for such location. For example, the system 100 can determine the depth value using a triangulation transformation. As an example, FIG. 19 is a graphical diagram of a triangulation geometry, according to at least one illustrated embodiment.

In some implementations, the system 100 uses the following equation to determine depth values at 412 of FIG. 4:

$$Z = \frac{Z_0}{1 + \frac{dZ_0}{Bf}}; \quad (1)$$

where d is the disparity, f is the focal length, B is the baseline distance, $Z_0$ is the reference distance, and Z is the depth value to be determined. In some implementations, d and f are in terms of pixels and, therefore, Bf is in pixel-meters.

In further implementations in which the projector and image capture device are not located on the same depth plane, the system 100 can use the following equation to determine depth values at 412 of FIG. 4:

$$Z = \frac{Z_0}{1 + \frac{d(z_0 + \alpha)}{Bf}}; \quad (2)$$

where $\alpha$ is a depth distance by which the projector is offset from the image capture device.

Referring again to FIG. 4, at 414, system 100 determines whether one or more additional rows of pixels are to be processed. If system 100 determines that one or more additional rows of pixels are to be processed, then method 400 returns to 406 and considers the next row of pixels. However, if the system 100 determines that no additional rows of pixels are to be processed, then method 400 proceeds to 416.

At 416, the system 100 optionally interpolates a three-dimensional point cloud that contains the depth values determined for each row of pixels at 412. For example, the system 100 can perform interpolation at 416 to obtain a three-dimensional point cloud in which the points are evenly spaced in the X and/or Y directions.

At 418, the system 100 optionally displays the depth values graphically. For example, the three-dimensional point cloud can be rendered in two dimensions on the display 122 of the system 100. The rendering can be interactive (e.g. rotatable, zoomable, etc.).

Figure 20:
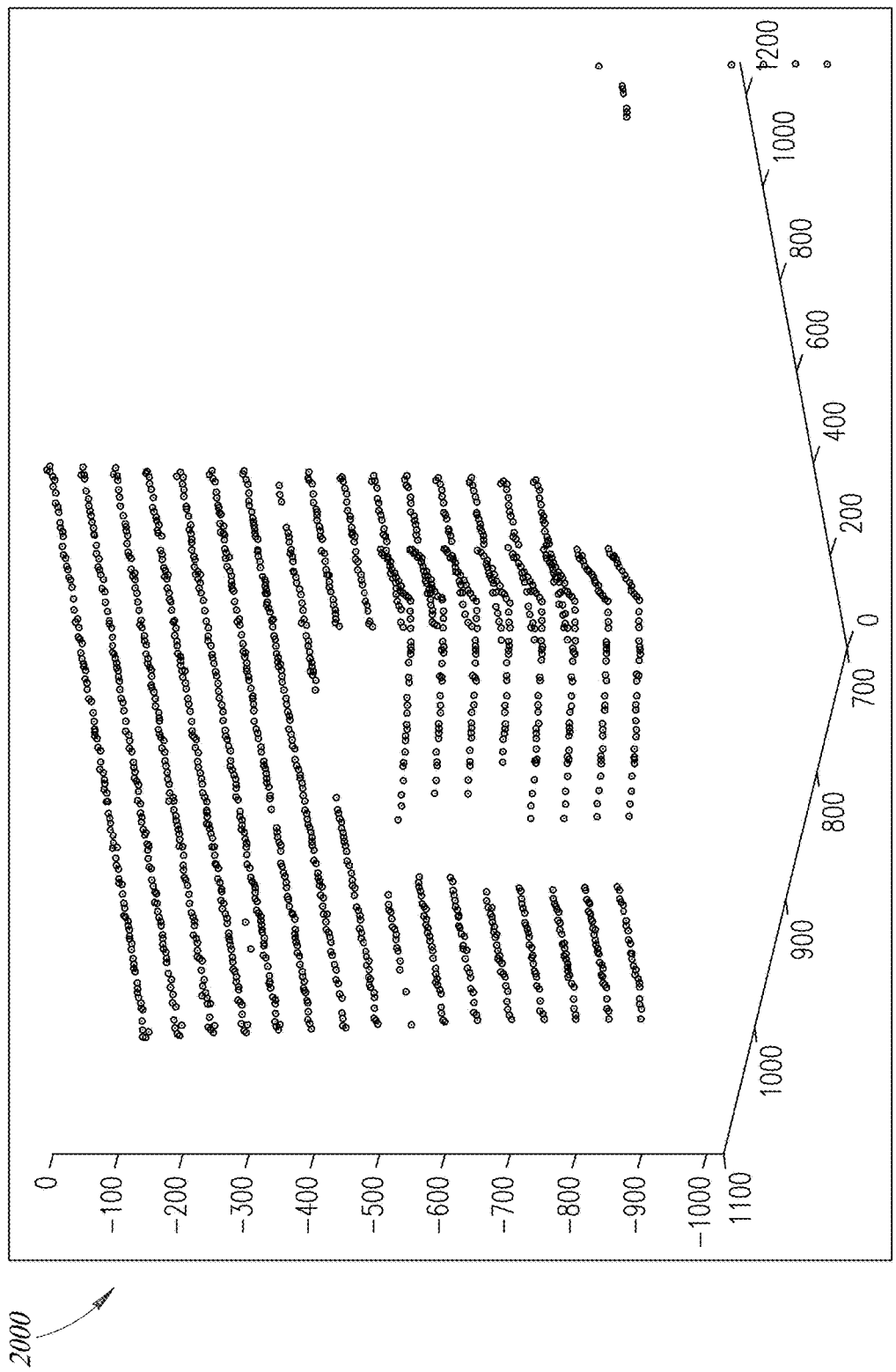
FIG. 20 is a perspective view of an example three-dimensional point cloud of depth values determined for the scene of FIG. 8, according to at least one illustrated embodiment.

As an example, FIG. 20 is a perspective view 2000 of an example three-dimensional point cloud of depth values determined for the scene of FIG. 8, according to at least one illustrated embodiment. In particular, the depth values graphed in FIG. 20 result from processing every $50^{th}$ row of the image 800 of FIG. 8 according to the techniques of the present disclosure. The target plane and the tilted box included in image 800 are easily detectable within the three-dimensional point cloud of FIG. 20.

Figure 21:
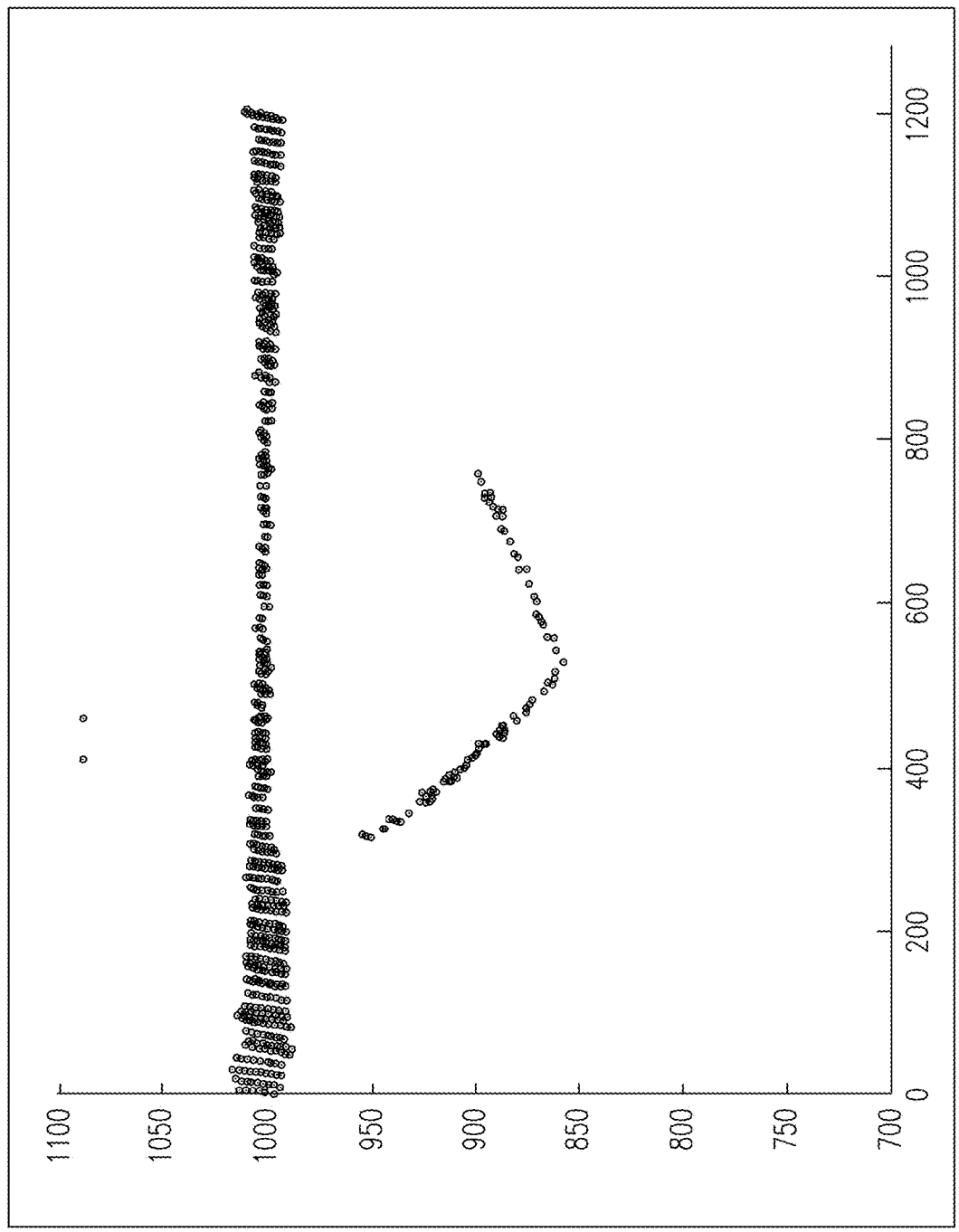
FIG. 21 is a top-down view of the example three-dimensional point cloud of depth values of FIG. 20, according to at least one embodiment.

As another example, FIG. 21 is a top-down view 2100 of the example three-dimensional point cloud of depth values of FIG. 20, according to at least one embodiment.

In further implementations, three-dimensional printing or other techniques may be performed to transform the three-dimensional model into a tangible structure. As another example, the model of the scene can be integrated into a larger scale (e.g., manufacturing-plant-scale or world-scale) model or provided as a feature of an interactive map.

The systems and methods of the present disclosure will now be discussed with reference to certain stereo camera techniques to illustrate the technological benefits of the present disclosure, including significant enhancements in processing time.

Consider the example that has been previously described, where the structured light pattern encodes a de Bruijn sequence of order n=7 and N=1280. Suppose the system 100 uses a P tap linear FIR filter to deblur the image to assist in peak detection, width value determination and binarization, and code identification. For an image row of N pixels, order NP operations will be performed to deblur the image, followed by order N operations to find the width values and order Q binarizations of the width values to identify Q codes in the row. Any distance Z from essentially 0 to infinity can be computed, corresponding to disparities of $d_{max}$ to d. Thus, a total of (N+1)P+Q operations per row are performed to compute the disparities.

The length P of the FIR filter for deblurring can be related to the element size. The element size E can be, for example, about ⅓ the bit size N/Q, so the element size can be represented as E=N/3Q. A deblurring filter is typically about three times the size of the blur function it is trying to deblur, so a reasonable estimate is P=N/Q, which is the same as the bit size. So the total number of operations per row is (N+1)N/Q+Q, which equals $N^2/Q+N/Q+Q$, which is approximately $N^2/Q$ for typical values of N and Q.

Compare this with the stereo correlation case. The correlation needs to include n bits of the code in order to find a unique pattern, which corresponds to nN/Q pixels. The correlation operation needs to search for these nN/Q pixels over a disparity range of $d_{max}$ in order to find the object at an arbitrary distance. There are Q codes across the image, so the correlation can be done on a spacing of N/Q columns. On the order of (nN/Q pixels/codes)×($d_{max}$ shifts)×(Q codes/row) are needed per row to correlate all of the codes in a row, or $d_{max}$nN operations per row.

In the example given above, the techniques of the present disclosure can be performed in $N^2/Q+N/Q+Q$ operations per row to compute the disparities, including deblurring. On the other hand, the correlation technique requires $d_{max}$nN operations per row. Using N=1280, n=7, and Q=135 yields 12281 and $8960d_{max}$ operations respectively.

To find the equivalent processing point between the two techniques, set $12281=8960d_{max}$. In view of such, it can be seen that the techniques of the present disclosure will be faster (i.e., require fewer processing operations) than stereo correlation techniques for any $d_{max}>1$, which implies that is the techniques of the present disclosure will be faster for any nontrivial computation of distance. In fact, $d_{max}$ may often be as high as the entire image width N, so the speedup provided by the present disclosure over correlation is on the order of N, the number of pixels in the width of the image. Therefore, in the example case provided above, the systems and methods of the present disclosure are more than 1000 times faster than stereo correlation techniques.

Those of skill in the art will recognize that many of the methods or algorithms set out herein may employ additional acts, may omit some acts, and/or may execute acts in a different order than specified.

The various embodiments described above can be combined to provide further embodiments. Aspects of the embodiments can be modified, if necessary, to employ systems, circuits and concepts of the various patents, applications and publications discussed herein to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method to determine depth values, the method comprising:
projecting a structured light pattern towards a target region, the structured light pattern comprising a plurality of parallel bars that encode a plurality of codes;
receiving an image of at least a portion of the target region, the image comprising a plurality of pixels representative of at least a portion of the structured light pattern; and
for each of a plurality of rows of pixels that are transverse to the plurality of parallel bars:
decoding the plurality of parallel bars represented in the row of pixels to identify a location of each of the plurality of codes in the row of pixels;
determining a plurality of disparities respectively between the identified locations of the plurality of codes and a plurality of reference locations respectively associated with the plurality of codes; and
determining a depth value for each identified location based at least in part on the determined disparity for such location;
performing a spatial modulation encoding with respect to a binary de Bruijn sequence of order n to obtain the structured light pattern, wherein n comprises a positive integer, and performing a spatial frequency modulation coding technique comprises transforming each bit of value 1 in the binary de Bruijn sequence into a lit element of a width E and a first dark element of the width E and transforming each bit of value 0 in the binary de Bruijn sequence into the lit element of the width E and a second dark element of width 3E.

2. The method of claim 1 wherein decoding the plurality of parallel bars to identify a location of each of the plurality of codes comprises determining a plurality of width values respectively between the plurality of parallel bars represented in the row of pixels and identifying the location of each of the plurality of codes in the row of pixels based at least in part on the plurality of width values.

3. The method of claim 2 wherein determining a plurality of width values comprises identifying a plurality of pixel intensity value peaks that respectively correspond to centers of the plurality of parallel bars represented in the row of pixels and determining the plurality of width values respectively between the plurality of pixel intensity value peaks.

4. The method of claim 3 wherein determining a plurality of pixel intensity value peaks comprises deblurring the image with a linear finite impulse response (FIR) deblurring equalizer and performing a peak finding scheme with respect to a plurality of pixel intensity values of the row of pixels.

5. The method of claim 1, further comprising:
projecting the structured light pattern comprising the plurality of parallel bars toward a planar surface displaced at a known distance;
receiving a reference image of the planar surface, the reference image comprising a second plurality of pixels; and
storing, for at least one row of the second plurality of pixels of the reference image that is transverse to the plurality of parallel bars, a position of each of the plurality of codes within such row as the reference location of such code.

6. A method to determine depth values, the method comprising:
projecting a structured light pattern towards a target region, the structured light pattern comprising a plurality of parallel bars that encode a plurality of codes;
receiving an image of at least a portion of the target region, the image comprising a plurality of pixels representative of at least a portion of the structured light pattern; and
for each of a plurality of rows of pixels that are transverse to the plurality of parallel bars:
decoding the plurality of parallel bars represented in the row of pixels to identify a location of each of the plurality of codes in the row of pixels;
determining a plurality of disparities respectively between the identified locations of the plurality of codes and a plurality of reference locations respectively associated with the plurality of codes; and
determining a depth value for each identified location based at least in part on the determined disparity for such location;
performing a spatial frequency modulation encoding with respect to a binary de Bruijn sequence of order n to obtain the structured light pattern, wherein n comprises a positive integer, and performing a spatial frequency modulation coding technique comprises performing the spatial frequency modulation coding technique with respect to the binary de Bruijn sequence of order 7 and comprising 128 unique, overlapping codes.

7. A method to determine depth values, the method comprising:
projecting a structured light pattern towards a target region, the structured light pattern comprising a plurality of parallel bars that encode a plurality of codes;
receiving an image of at least a portion of the target region, the image comprising a plurality of pixels representative of at least a portion of the structured light pattern; and
for each of a plurality of rows of pixels that are transverse to the plurality of parallel bars:
decoding the plurality of parallel bars represented in the row of pixels to identify a location of each of the plurality of codes in the row of pixels;
determining a plurality of disparities respectively between the identified locations of the plurality of codes and a plurality of reference locations respectively associated with the plurality of codes; and
determining a depth value for each identified location based at least in part on the determined disparity for such location, wherein decoding the plurality of parallel bars to identify a location of each of the plurality of codes comprises determining a plurality of width values respectively between the plurality of parallel bars represented in the row of pixels and identifying the location of each of the plurality of codes in the row of pixels based at least in part on the plurality of width values and identifying the location of each of the plurality of codes based at least in part on the plurality of width values comprises transforming the plurality of width values into a decoded binary sequence and identifying the location of each of the plurality of codes within the decoded binary sequence.

8. The method of claim 7 wherein transforming the plurality of width values into a decoded binary sequence comprises generating a histogram based at least in part on the plurality of width values, determining a threshold width value based at least in part on the histogram, and classifying each of the plurality of width values as a 1 value, a 0 value, or an error based at least in part on the threshold width value.

9. The method of claim 8 wherein generating a histogram based at least in part on the plurality of width values comprises generating the histogram based at least in part on the plurality of width values and the plurality of width values divided by 2.

10. The method of claim 9 wherein determining a threshold width value comprises identifying a median value of the histogram and multiplying the median value times 1.5.

11. The method of claim 8 wherein determining a threshold width value based at least in part on the histogram comprises generating a rolling threshold width value for each of the plurality of width values based on a moving window that spans two times a code length associated with the plurality of codes and wherein classifying each of the plurality of width values comprises classifying each of the plurality of width values as a 1 value, a 0 value, or an error based at least in part on the rolling threshold width value generated for such width value.

12. The method of claim 11, further comprising, for each of the plurality of rows of pixels:
determining that one or more of the identified locations of the plurality of codes are erroneous by comparing an observed sequential characteristic for each code to an expected sequential characteristic for each code.

13. The method of claim 7 wherein projecting a structured light pattern comprises projecting the structured light pattern comprising the plurality of parallel bars that encode a plurality of binary codes of bit length n and wherein identifying the location of each of the plurality of binary codes within the decoded binary sequence comprises identifying the location of a first bit of each of the plurality of codes in the decoded binary sequence.

14. A system comprising:
at least one processor; and
at least one non-transitory processor-readable medium that is communicatively coupled to the at least one processor and that stores processor-executable instructions that, when executed by the at least one processor, cause the system to:
receive an image that depicts at least a portion of a target region illuminated with a coded structured light pattern, the coded structured light pattern comprising a plurality of parallel bars that encode a plurality of codes, the image comprising a plurality of pixels representative of at least a portion of the coded structured light pattern; and
for each of a plurality of rows of pixels of the image that are transverse to the plurality of parallel bars:
decode the plurality of parallel bars represented in the row of pixels to identify a location of each of the plurality of codes;
determine a plurality of disparities respectively between the identified locations of the plurality of codes and a plurality of reference locations respectively associated with the plurality of codes; and
determine a depth value for each identified location based at least in part on the determined disparity for such location, wherein
the instructions that cause the system to decode the plurality of parallel bars represented in the row of pixels cause the system to determine a plurality of width values respectively between the plurality of parallel bars represented in the row of pixels and identify the location of each of the plurality of codes based at least in part on the plurality of width values, and the instructions that cause the system to identify the location of each of the plurality of codes based at least in part on the plurality of width values cause the system to transform the plurality of width values into a decoded binary sequence and identify the location of each of the plurality of codes within the decoded binary sequence.

15. The system of claim 14 wherein the plurality of codes comprise a binary de Bruijn sequence of order n, wherein n comprises a positive integer.

16. The system of claim 14 wherein the instructions that cause the system to determine a plurality of width values respectively between the plurality of parallel bars cause the system to identify a plurality of pixel intensity value peaks that respectively correspond to centers of the plurality of parallel bars represented in the row of pixels and determine the plurality of width values respectively between the plurality of pixel intensity value peaks.

17. The system of claim 14 wherein the instructions that cause the system to transform the plurality of width values into a decoded binary sequence cause the system to generate a histogram based at least in part on the plurality of width values, determine a threshold width value based at least in part on the histogram, and classify each of the plurality of width values as a 1 value, a 0 value, or an error based at least in part on the threshold width value.

18. The system of claim 14 wherein the instructions that cause the system to generate a histogram based at least in part on the plurality of width values cause the system to generate the histogram based at least in part on the plurality of width values and the plurality of width values divided by 2 and wherein the instructions that cause the system to determine a threshold width value based at least in part on the histogram cause the system to identify a median value of the histogram and multiply the median value times 1.5.

19. The system of claim 14 wherein the instructions further cause the system to, for each of the plurality of rows of pixels:
compare an observed sequential characteristic of each code to an expected sequential characteristic of such code to determine whether the identified location of such code is erroneous.

20. The system of claim 14 wherein the instructions further cause the system to:
obtain a reference image that depicts a planar surface displaced at a known distance and illuminated with the plurality of parallel bars that encode the plurality of codes, the reference image comprising a second plurality of pixels; and
for at least one row of the second plurality of pixels that is transverse to the plurality of parallel bars, decode the plurality of parallel bars represented in the row of pixels to identify a reference location of each of the plurality of codes.

21. The system of claim 14, further comprising:
a projector selectively operable to project the coded structured light pattern towards the target region, the projector separate from but attachable to a two-dimensional image capture device.

* * * * *